(12) United States Patent
Parker

(10) Patent No.: US 7,314,057 B2
(45) Date of Patent: Jan. 1, 2008

(54) PEDESTAL HYDRANT

(76) Inventor: Phil A. Parker, Rt.2, Box 2264, Naples, TX (US) 75568

(*) Notice: Subject to any disclaimer, the term of this patent is extended or adjusted under 35 U.S.C. 154(b) by 164 days.

(21) Appl. No.: 11/347,706

(22) Filed: Feb. 3, 2006

(65) Prior Publication Data

US 2006/0169323 A1 Aug. 3, 2006

Related U.S. Application Data

(63) Continuation-in-part of application No. 10/146,211, filed on May 15, 2002, now Pat. No. 7,143,779.

(60) Provisional application No. 60/294,174, filed on May 29, 2001.

(51) Int. Cl.
*E03B 7/12* (2006.01)
(52) U.S. Cl. ..................... 137/296; 137/300
(58) Field of Classification Search .............. 137/291, 137/296, 300
See application file for complete search history.

(56) References Cited

U.S. PATENT DOCUMENTS

| | | | |
|---|---|---|---|
| 1,837,542 A * | 12/1931 | Griswold et al. | 166/72 |
| 2,585,694 A * | 2/1952 | Sisson | 137/296 |
| 4,971,097 A | 11/1990 | Hunley, Jr. et al. | |
| 5,129,416 A | 7/1992 | Ackroyd | |
| 5,158,105 A * | 10/1992 | Conway | 137/296 |
| 5,201,338 A * | 4/1993 | McKeague | 137/238 |
| 5,947,150 A | 9/1999 | Ryan | |
| 6,216,722 B1 | 4/2001 | Solomon | |
| 6,684,900 B1 * | 2/2004 | McKeague | 137/294 |

* cited by examiner

*Primary Examiner*—John Fox
(74) *Attorney, Agent, or Firm*—Slater & Matsil, L.L.P.

(57) ABSTRACT

A fluid delivering hydrant providing a valve actuated assembly with enclosing shroud and water resistive doom handle assembly to protect the assembly from exposure to the weather while preventing entry of rainwater into a building structure upon the roof of which the device has been installed. The fluid hydrant also includes structures for preventing water or fluid from remaining in the hydrant after the fluid flow valve is closed. This presents possibly freezing of the fluid and damage to the system.

14 Claims, 22 Drawing Sheets

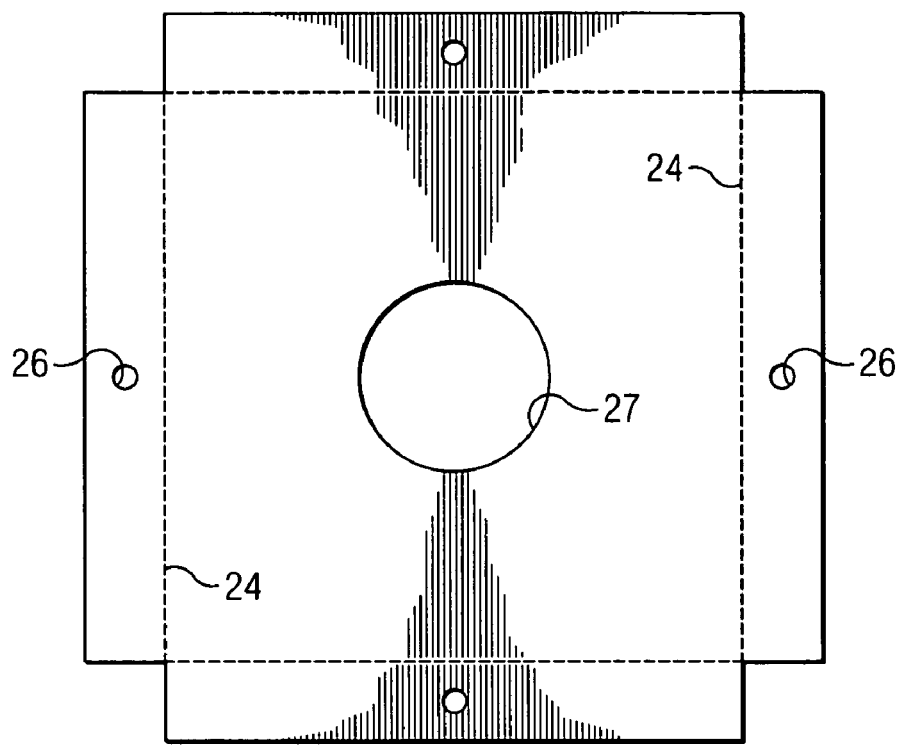
FIG. 5A
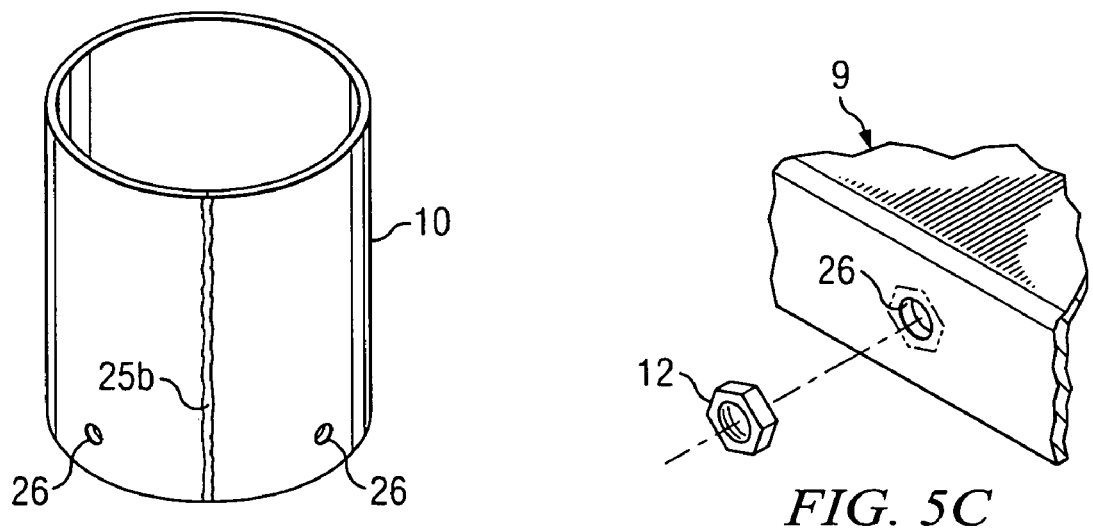
FIG. 5B
FIG. 5C

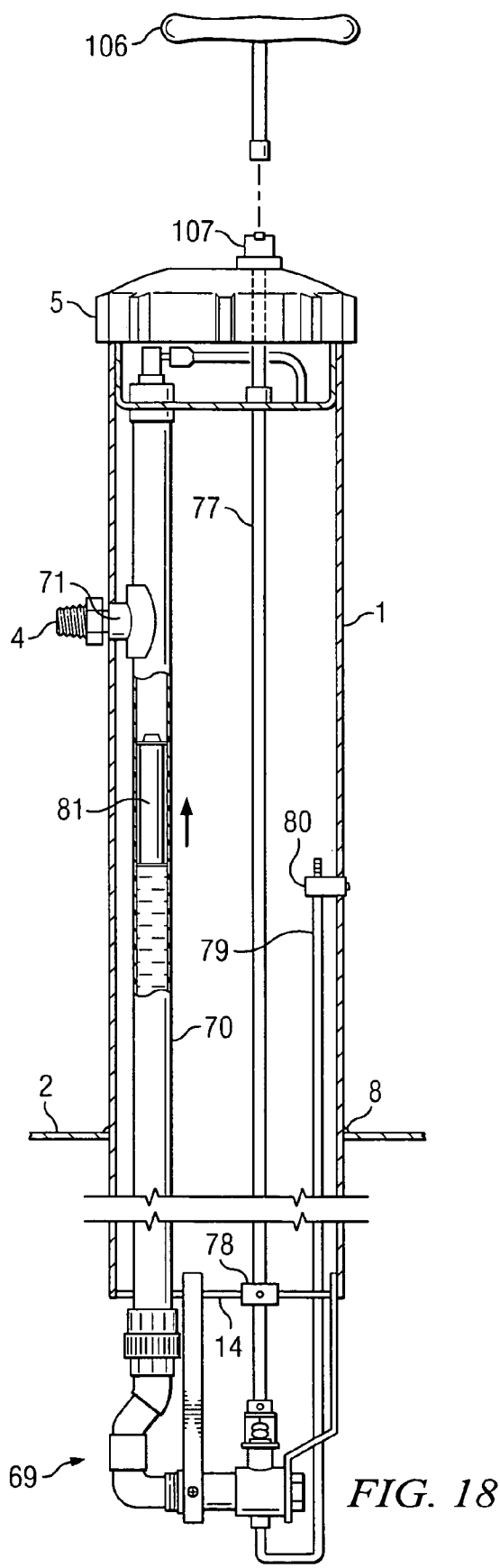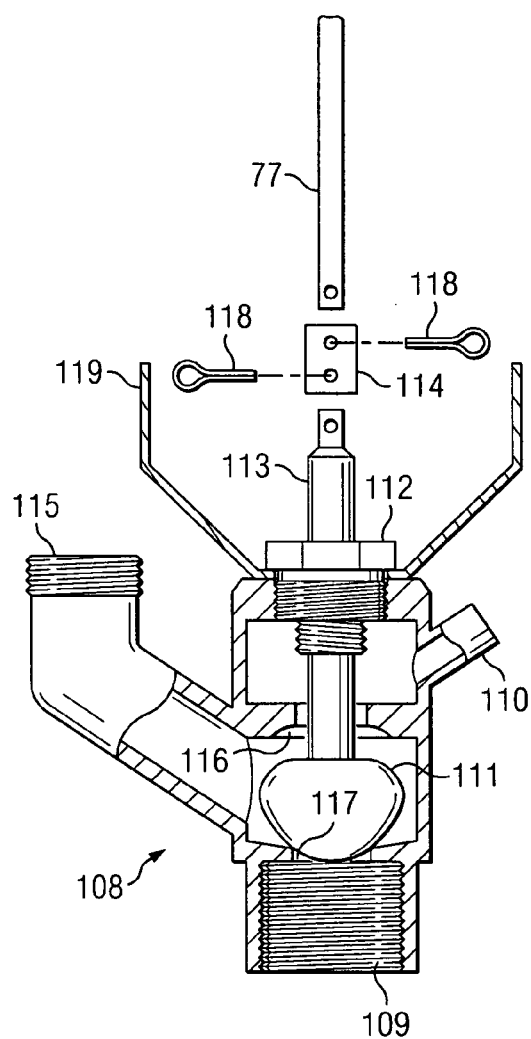
FIG. 18
FIG. 19A

PEDESTAL HYDRANT

This application is a Continuation-In-Part of U.S. Non-Provisional patent application Ser. No. 10/146,211, filed on May 15, 2002 now U.S. Pat. No. 7,143,779, entitled "PEDESTAL HYDRANT," which application claims the benefit of U.S. Provisional Patent Application No. 60/294,174, filed on May 29, 2001, entitled "PEDESTAL HYDRANT," which applications are incorporated herein by reference.

FIELD OF INVENTION

This invention relates to fluid delivery devices exposed to extreme cold temperatures.

BACKGROUND OF THE INVENTION

In the field of construction and, especially instances relating to the plumbing trade, it is common to install a source of potable water on a flat roof. The source is often a water hydrant or bibb that permits maintenance personal to use the water to hose down or wash equipment mounted upon the roofs surface. Such equipment would include roof top air conditioners and exhaust fans that periodically require cleaning in order to assure efficient operation, void of dust and other wind blown debris.

Typically, such roof top water hydrants are installed in a manner that prevents rainwater from entering the building through roof penetrations used to provide the water source to the hydrant. FIGS. 22, 23, and 24 are prior art illustrations of such devices. FIG. 22 shows a freeze resistant hydrant housed within a sheet metal hooded enclosure. The hooded enclosure includes loose insulation around the insulated piping to prevent freezing. The hood is intended to prevent rainwater from penetrating the enclosure. The entire apparatus is mounted to the roof with flashing to prevent leakage at its perimeter.

FIG. 23 is a simple hose bibb type of hydrant that extends through an aperture in a flashing or pitch-pan that is sealed to prevent rainwater from entering the building through the aperture. FIG. 24 shows the use of a common frost-proof post hydrant mounted atop a roofline with the penetration at the roof sealed at a pitch-pan.

All of the above techniques are common in the construction industry and may include various modifications as to height of placement of the hydrant above the roof, the design of the enclosure, or the means used to prevent rainwater from entering the building. Unfortunately, each of the techniques depends on the lack of human error in their installation to assure satisfactory performance. To illustrate and as shown in FIG. 20, the enclosure is typically formed and fitted by an individual. Therefore, the skills and craftsmanship, or lack of skill of the individual, determines if the installation is successful. If the enclosure is poorly made, fitted or sealed, then there is a risk of leakage. If the insulation is not properly installed, then there is the risk of a pipe freezing during colder weather.

As shown In FIG. 24, the watertight seal at the pitch pan is subject to problems simply because the post hydrant extends well above the roofline. For example, while being used, it will be easy to pull and then push the post about with significant leverage, and thereby create potential sources of leakage. Similarly, the hydrant in FIG. 24 may be subject to disruptions of the seal at the pitch pan.

SUMMARY OF THE INVENTION

According to one embodiment, the invention is an assembled fluid delivery device that provides water for the purpose of cleaning roof mounted equipment, and that also prevents rainwater from leaking into the building, while at the same time providing freeze protection for the assembly. The device has a conventional valve assembly and utilizes conventional piping and fitting. The pedestal however is enclosed within a solid shroud. The shroud is made of stainless steel to prevent deterioration of the pedestal from weathering. Other suitable materials may include steel piping or sheet metal that is protected from the effects of the weather by galvanizing, painting, or powder coating and plastic. A layer of an insulation material surrounds the piping and valve assembly to prevent freezing.

A dome handle sets atop the pedestal, and serves two purposes. First, the dome handle permits ease in the opening and the closing of the hydrant. Second, it serves as a watershed to prevent rainwater and such from entering the shroud and the building structure. Additionally, the shroud prevents rusting and other undesired effects caused by the weather the insulation prevents freezing.

A stainless steel base is attached to the shroud with a continuous welded seam. The continuous seam enables roofing materials to provide a watertight seal between the pedestal and the roof surface. A reinforcing flange attached to the lower portion of the pedestal hydrant, secures the pedestal to the roof structure. Conventional piping fittings are used to provide the water supply and drain piping to the pedestal hydrant.

Another embodiment of the invention provides a freeze-proof assembly without the requirement of gravity flow drain down piping. As will be illustrated, a drain pipe is typically connected to a drain fitting at the base of the hydrant. The piping, according to this embodiment, discharges at a suitable location, such as for example, a receptacle. It is also noted that flow of this discharged fluid is by gravity flow.

This freeze proof embodiment of the invention eliminates the need for drain piping. Persons skilled in the art will understand that a freeze proof post type hydrant will typically include a valve assemble that is positioned away from freezing weather, such that when the fluid valve is in the closed position, outlet piping such as a stand-pipe of the assembled hydrant drains away any water or fluid that might freeze. That is, water drains away from the exposed piping by the force of gravity. As discussed above with respect to roof mounted assemblies, portions of the hydrant exposed to extreme weather are those portions above the roof surface. The portions below the roofing surface typically being protected from the freezing weather. Similarly, according to FIG. 11, for hydrants located on the ground surface, portions of the hydrant exposed to extreme weather are above ground and the valve assembly is typically located under ground at or below the frost level.

In the case of a roof mounted hydrant assembly, drain piping is typically terminated according to an industry acceptable manner. This usually comprises an open-site sanitary drain receptacle. Ground installed hydrants on the other hand are often discharged directly into the surrounding earth. Discharging onto the spaced ground increases the risk of cross contamination between potable water and ground water.

Another prior art means of providing protection from freezing of this type of post or pedestal hydrant is the use of a drain down tank. In a drain down tank arrangement, a ventura valve assembly permits the evacuation of water that has been stored in a reservoir when the hydrant is opened. Upon closing of the hydrant, the water remaining in the stand-pipe drains into this empty storage tank. Although this method of addressing freeze problems is widely used, if the reservoir is not completely evacuated prior to drain down, water may remain within the standpipe. Additionally, if there are extended periods between usage, the stored water may become contaminated. Thus, there is the possibility of cross contamination with potable water if the hydrant assembly is opened absent positive pressure on the supply piping for the hydrant.

Accordingly, objects and advantages of the invention include:

A. The assembly is convenient for mounting atop a roof surface.

B. The connection fittings located at its base provide for ease in connections of water supply and drain.

C. The stainless steel shroud provides a freeze resistant housing with pipe insulation placed about the piping within.

D. The flange permits ease in the "flashing-in" of the hydrant assembly to the roof.

E. The lower flange enables the device to be securely affixed to the structural members of the roof.

F. The domed handle provides for actuation of the hydrant while preventing rainwater from penetrating the enclosure.

BRIEF DESCRIPTION OF THE DRAWINGS

For a more complete understanding of the present invention, and the advantages thereof, reference is now made to the following descriptions taken in conjunction with the accompanying drawing, in which:

FIGS. 5, 5A, 5B, and 5C are detail drawings of the under-deck flange;

FIG. 18 is a cross-sectional view of another freeze proof embodiment of the invention;

FIGS. 19A, 19B, and 19C are detailed views of a different type valve suitable for use with the freeze proof embodiment of FIGS. 12 and 18;

DETAILED DESCRIPTION OF ILLUSTRATIVE EMBODIMENTS

Figure 1:
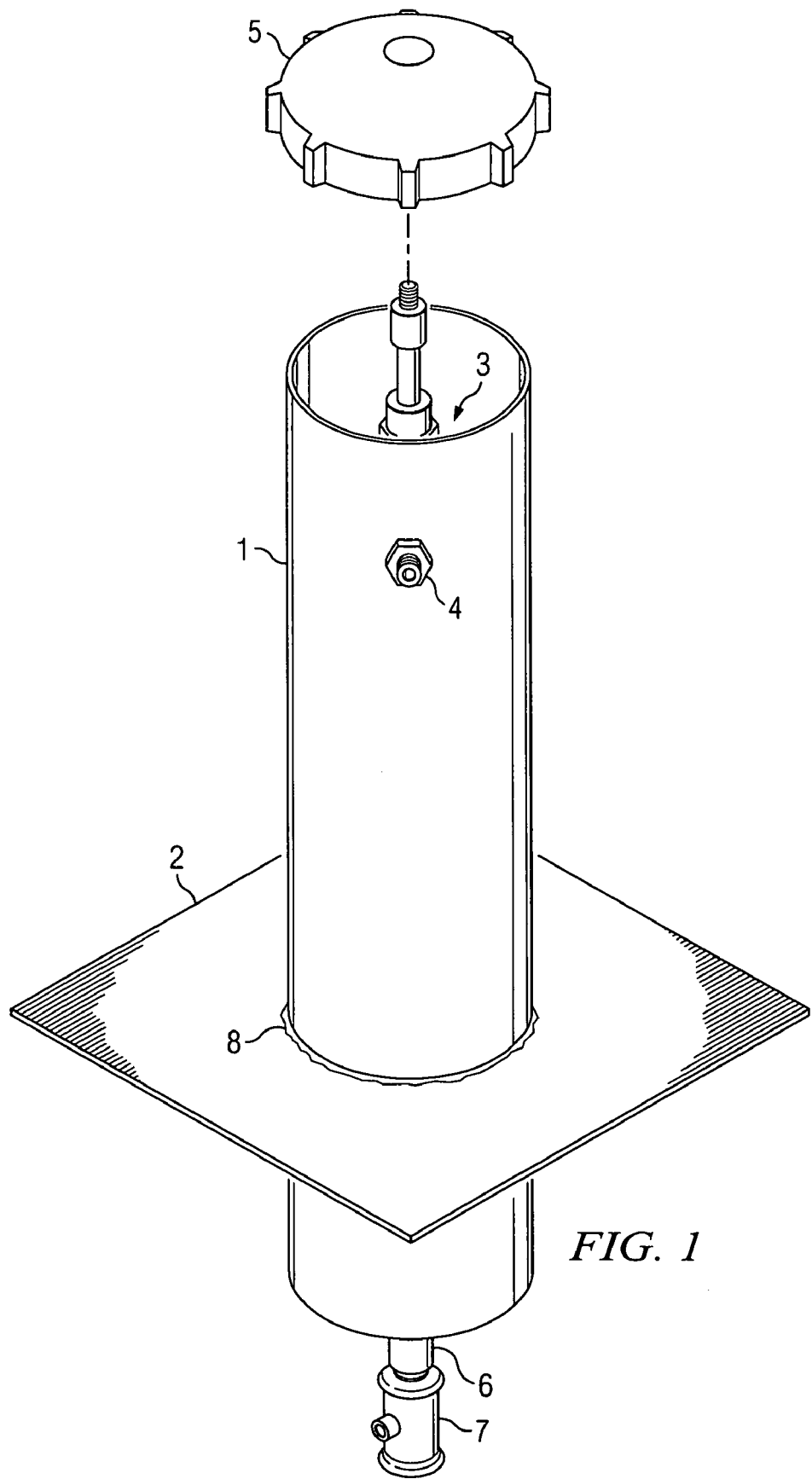
FIG. 1 is an overall view of the pedestal hydrant showing the primary components.

FIG. 1 is an isometric view of a pedestal hydrant that illustrates exposed components. As shown, stainless steel shroud 1 encases the angle globe valve 3 that includes both a threaded inlet and outlet. Hose fitting vacuum breaker 4 extends through the shroud from the valve through a hole or aperture in the shroud. Dome handle 5 is shown before attachment to the valve item. A stainless steel base 2 is secured to shroud 1 by a continuous welded seam 8 that extends around the perimeter of the shroud. At the lower extreme of the pedestal hydrant, there is shown a short threaded length of pipe 6 and a threaded tee 7. These components will be discussed hereinafter.

Figure 2:
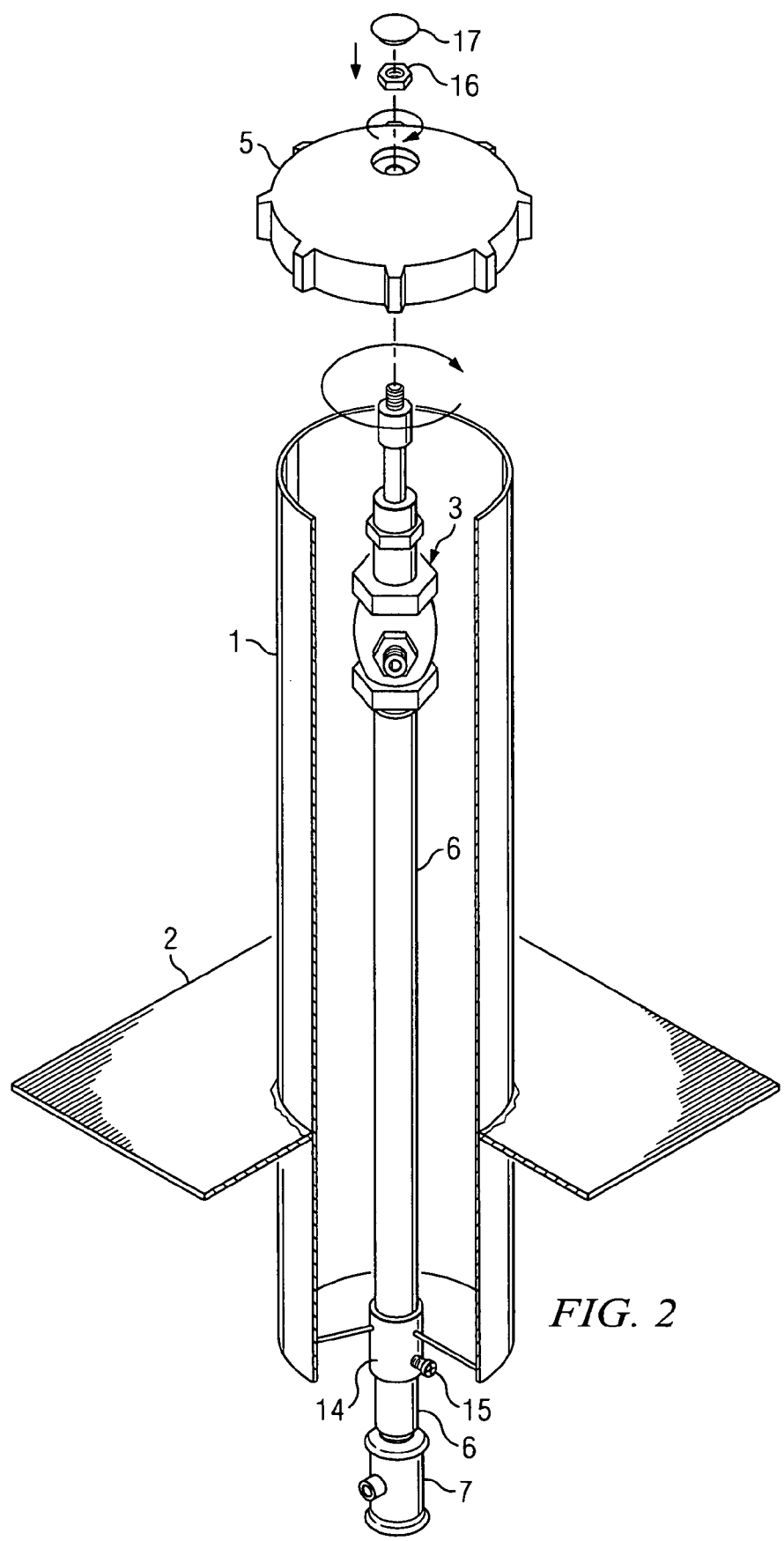
FIG. 2 is a cutaway view of the pedestal hydrant of FIG. 1.

FIG. 2 is a sectional view of FIG. 1 showing a full view of valve 3. Threaded pipe length 6 is shown as an extended length of a galvanized plated steel pipe that extends from the inlet of valve 3 and downward beyond the full length of shroud 1. Pipe length 6 is secured in place at stirrup 14 by set screws 15, which bear against the surface of the pipe length 6 and terminates at threaded tee 7. The circular arrow above dome handle 5 in FIG. 2 illustrates the turning motion of the dome handle when attached to valve 3. As is the case with most standard and conventional valves, turning the valve stem in a first direction (typically clockwise) will close the valve while turning the handle in the opposite direction will open the valve.

Figure 3:
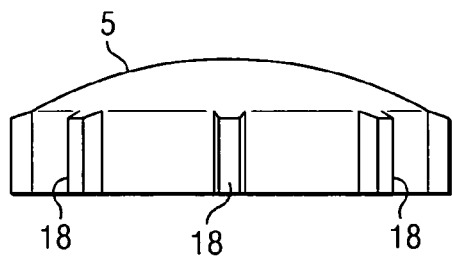
FIGS. 3, 3A, 3B, and 3C are detail drawings of the dome handle.
Figure 3A:
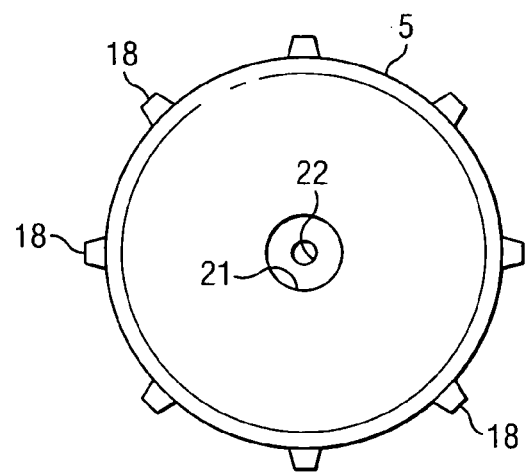
Figure 3B:
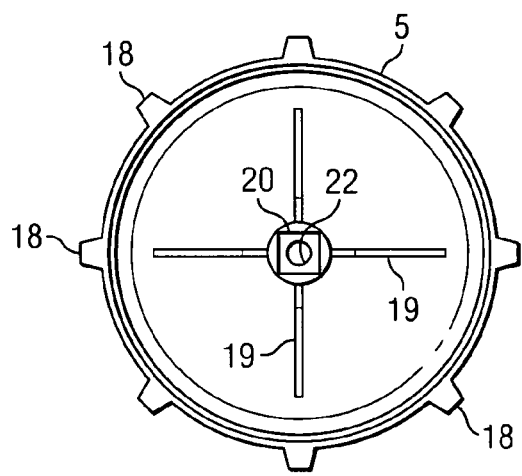

FIG. 3 is a side view of dome handle 5, and demonstrates the several finger grips 18 that are located around the surface of the handle. The handle may be constructed of cast aluminum, steel, copper, bronze, or any other type of durable material. FIG. 3A is a top view of the handle that also shows finger grips 18 along with stem securing nut cup 21 and round hole 22. Nut cup 21 provides a cavity whereby a threaded nut may rest in order to secure the dome handle to the stem of the valve. FIG. 3B is a view of the under side of dome handle 5, and as can be seen, several reinforcing ridges 19 are shown extending away from stem insertion cavity 20. Finger grips 18 are also visible in this view.

Figure 3C:
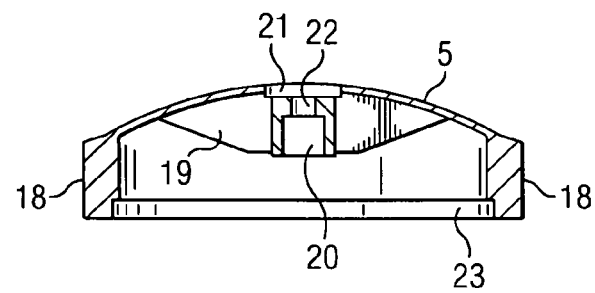

FIG. 3C is a sectional view of the dome handle 5 shown in FIG. 3. As shown in FIG. 3C, stem insertion cavity 20 is clearly illustrated, and is of a suitable size and shape to permit the stem of valve 3 to rest securely within the cavity without slipping. Round hole or aperture 22 is of sufficient diameter to permit the threaded portion of this same stem to pass through and extend into cup 21. A weather guard recess 23 is also shown. This recess extends around the full interior perimeter of the dome and when the globe valve is in the closed position, permits the dome handle to set snugly over the shroud 1. Further explanation of the use of the recess is discussed below.

Figure 4:
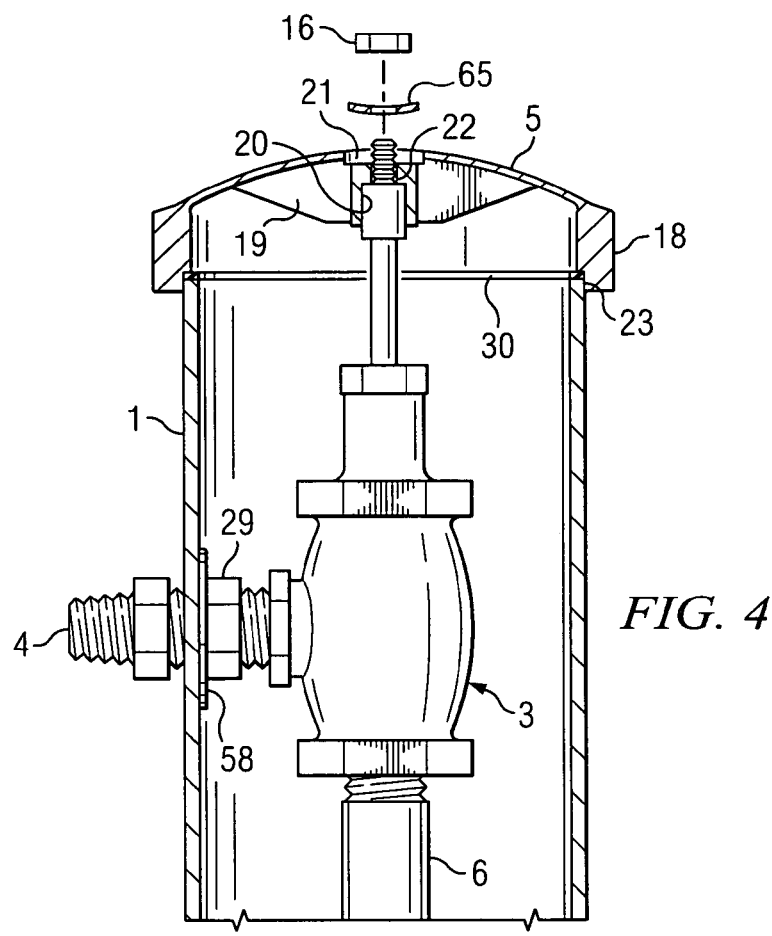
FIG. 4 is a partial sectional view of the pedestal hydrant.

FIG. 4 is sectional view of various portions of the pedestal hydrant. As shown, dome handle 5 is in position on the stem of globe valve 3. The stem fits into stem insertion cavity 20 with the threads passing through round hole 22, and into stem securing nut cup 21. Stem securing nut 16 is a locking type threaded nut that is then turned or threaded onto the stem to secure the dome handle onto the valve stem. The use of a wave washer 65 provides added compression for the stem to seat within the valve. This compression is opposed by the compression of weathering-guard gasket 30 located within dome handle 5 and seated against stainless steel shroud 1. FIG. 4 further illustrates how weather-guard recess 23 fits around the shroud. The addition of weather-guard gasket 30 assures a positive watertight seal when the valve is in the closed position. This prevents rainwater from entering the interior cavity of the shroud.

A hose adapter 29 is threaded into the outlet port of valve 3. Gasket 58 is placed around the outlet side of adapter 29 prior to its insertion through a hole in shroud 1. Once inserted through the hole, hose fitting vacuum breaker 4 is attached to adapter 29. This is accomplished by threading vacuum breaker 4 onto the threads of the adapter. Positioning gasket 58 on the inside of the shroud ensures a watertight seal, and threaded pipe length 6 is illustrated in position at the inlet to valve 3.

Figure 5:
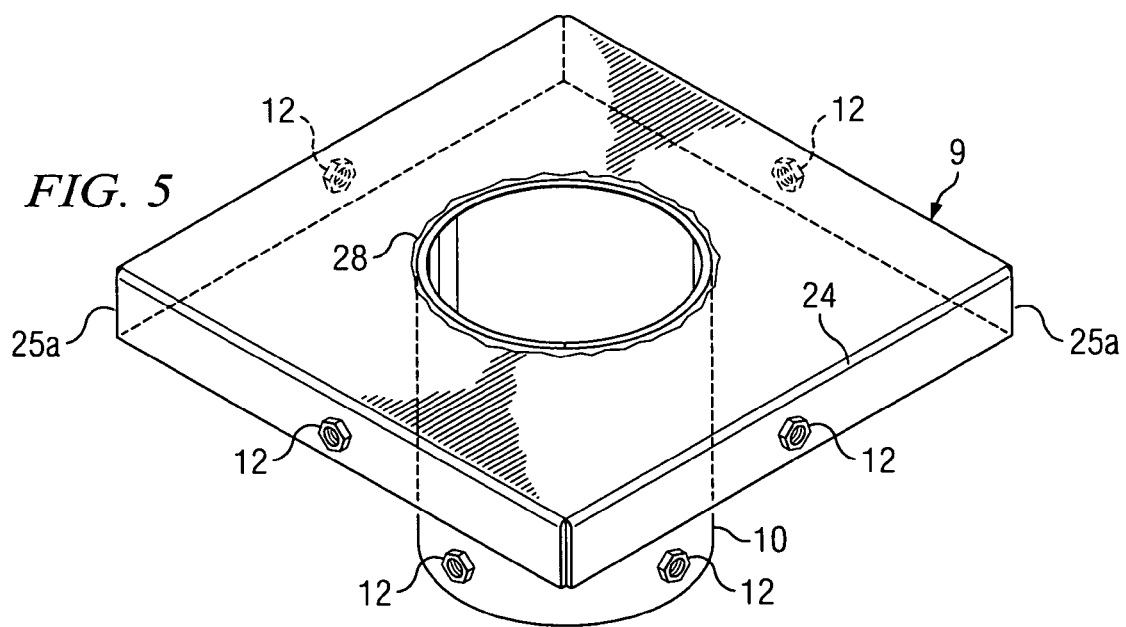

FIGS. 5, 5A, 5B, and 5C detail the components of the under-deck flange 9. Threaded nuts 12 (e.g. hex nuts) are positioned around the exterior perimeter of this flange and are welded into place directly over holes 26 as shown in FIG. 5A. Bend lines 24 run along each side of this flange, and welded seams 25a are at each corner of the bent portion of flanges 24.

Under-deck cylinder 10 is attached to flange 9 of the under deck with a tack-weld seam 28. This cylinder is of sufficient size to permit the fully assembled flange 9 to fit around the shroud of the pedestal hydrant. Threaded hex nuts 12 are positioned and then welded along the lower section of cylinder 10. FIG. 5A illustrates the shape of under-deck flange 9 prior to forming and welding. Cylinder aperture or hole 27 is located in the center of the flange. Holes 26 appear along each side, and as mentioned above bend points 24 are indicated at each side. The under-deck cylinder is positioned around this cylinder hole and may then tack-welded in several spots to secure it to the flange.

FIG. 5B illustrates how a round piece of sheet metal is rolled in order to form the cylinder 10. Weld seam 25b joins the two ends of the cylinder. Holes 26 at the bottom of the cylinder indicate the location where threaded hex nuts, as discussed above, are welded to cylinder 10, and FIG. 5C illustrates how threaded hex nuts 12 are welded to under-deck flange 9 directly over holes 26.

Figure 6:
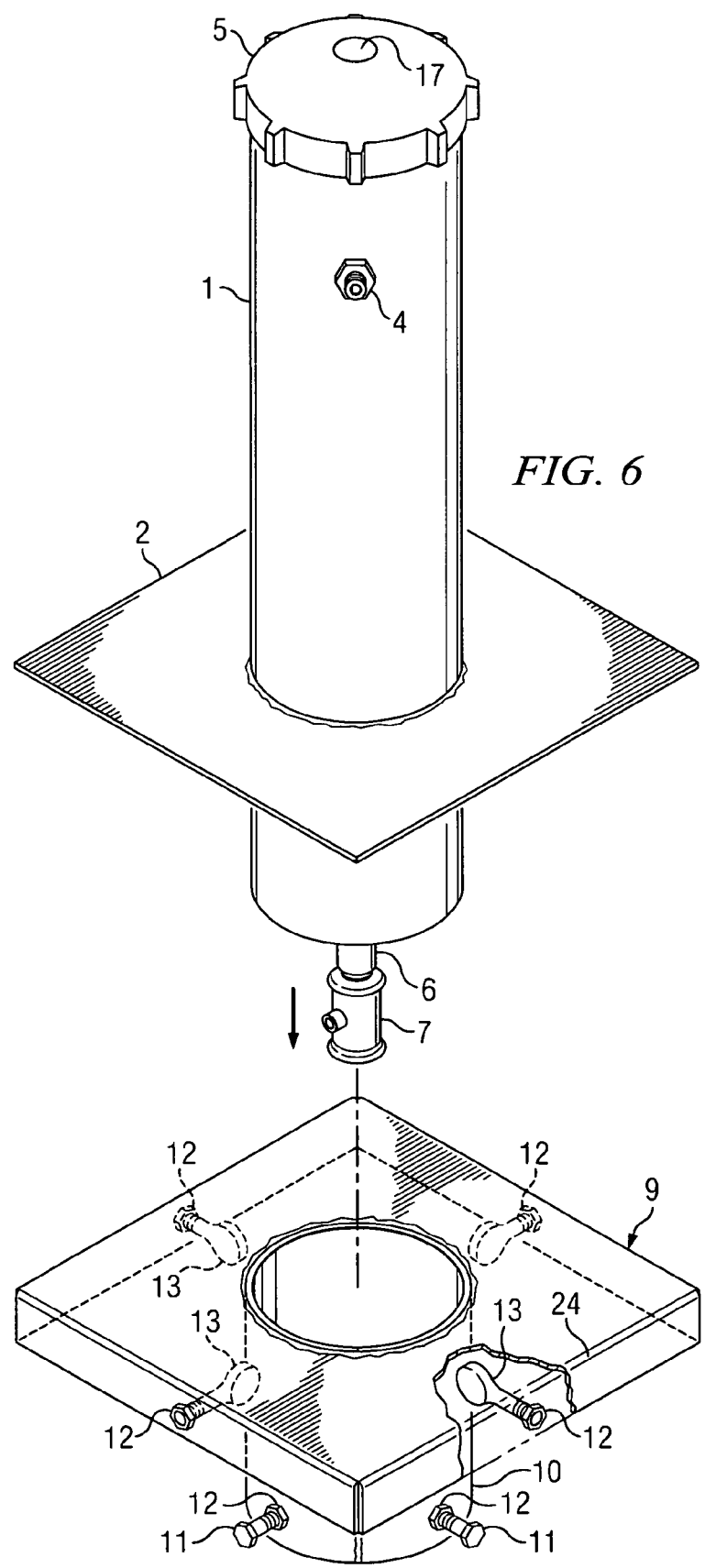
FIG. 6 demonstrates how the under-deck flange slips over the stainless shroud.

FIG. 6 illustrates the assembly of the pedestal hydrant shroud with under-deck flange 9. Under-deck cylinder 10 slips over shroud 1 from the bottom, and cylinder 10 has hex-head screws inserted for later fastening into the threaded hex nuts located at the bottom of the cylinder. Wing nut set screws 13 may be inserted from the inner side of the under-deck flange into threaded the hex nuts 12 that are welded along the outer surface of the flange. Threaded pipe length 6 and threaded tee 7 are illustrated so as to demonstrate that these components will pass through the cylinder and can be connected to a water source once installation of the pedestal hydrant is complete. Also disclosed in the figure is a snap-in cover 17. This cover may be made of plastic and is snapped into place by applying hand pressure and conceals stem securing nut 16 located in securing nut cup 21.

Figure 7:
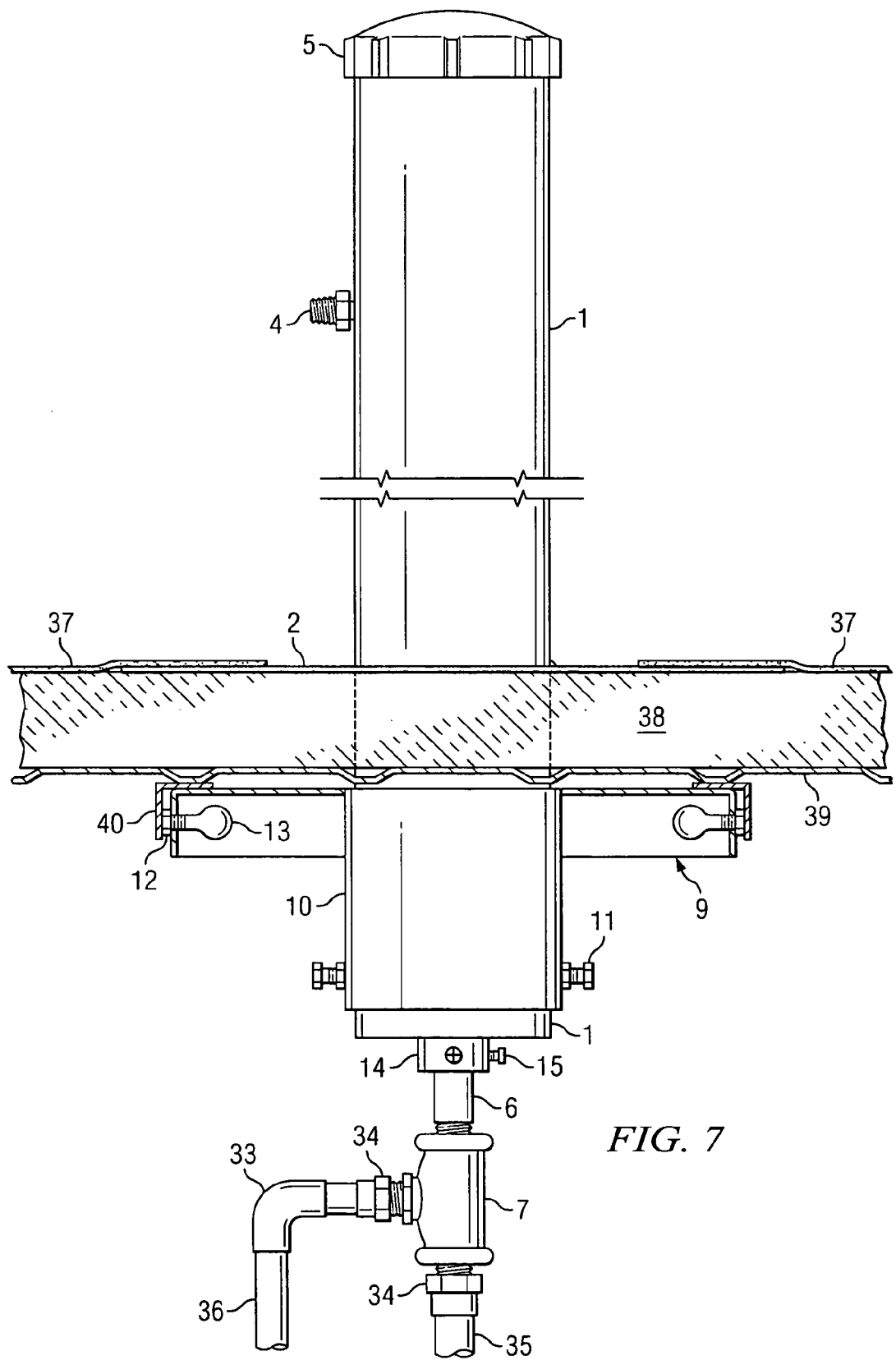
FIG. 7 is a side view of the pedestal hydrant installed on a roof.

FIG. 7 illustrates a complete assembled and installed pedestal hydrant. As seen in FIG. 7, the hydrant is installed on top of an insulated roof as shown at 37, 38, and 39. Stainless steel base 2 rests firmly on this insulation material. Roofing material 37 is applied to the adjoining surface to make a watertight joint between the base and the roof surface. The roofing material may be applied according to any of several commonly known conventional methods.

Once the pedestal hydrant shroud is in position, under-deck flange 9 is slipped up and then around the bottom shroud of the hydrant from below the roof surface, and is fitted securely against roof decking 39. A steel angle framing 40, of conventional and common design, is shown at the roof deck. The flange is fitted securely under the framing and secured in place by tightening the wing nut set screws against the framing. Once the flange is secured, hex-head screws 11 are tightened against shroud 1. In this manner, the pedestal hydrant is positively attached to the roofing structure.

Also, once the pedestal hydrant is firmly in place, a water supply connection is made at threaded tee 7, and a pipe fitting adapter 34 is inserted into the open threads at the inlet of the tee. Water supply piping 35 is then provided from a water source to the hydrant. Drain piping 36 is attached to tee 7 at its outlet branch, and adapter 34 and pipe elbow fitting 33 are used to illustrate common methods of making this connection. As will be appreciated by those skilled in the art, a supply valve is typically provided to turn the pedestal hydrant ON and OFF. It is also seen that threaded tee 7 serves dual purposes. First, if galvanized pipe stock is used for the threaded pipe length 6, a fitting to provide separation from dissimilar metals may be required to meet industry standards. Thus, a brass fitting may be utilized for threaded tee 7 to comply with this standard. Second, although insulation is installed around the valve and piping assembly of the pedestal hydrant, it may be advantageous to drain the piping in order to prevent potential freeze damage to the components. As illustrated in FIG. 7, threaded tee 7 enables the connection of a drain pipe for such purpose.

Figure 8:
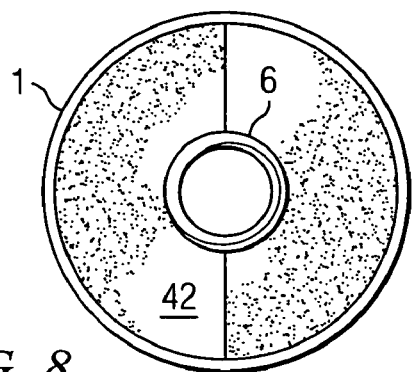
FIGS. 8, 8A, 8B, and 8C are detail drawings of various components of the pedestal hydrant.
Figure 8A:
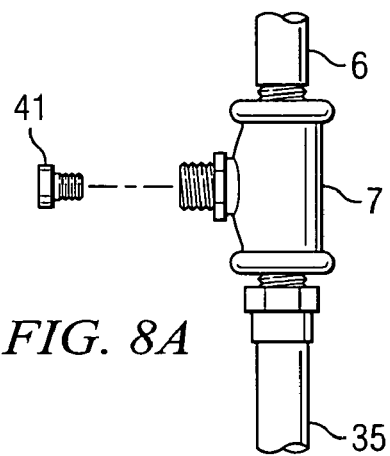
Figure 8B:
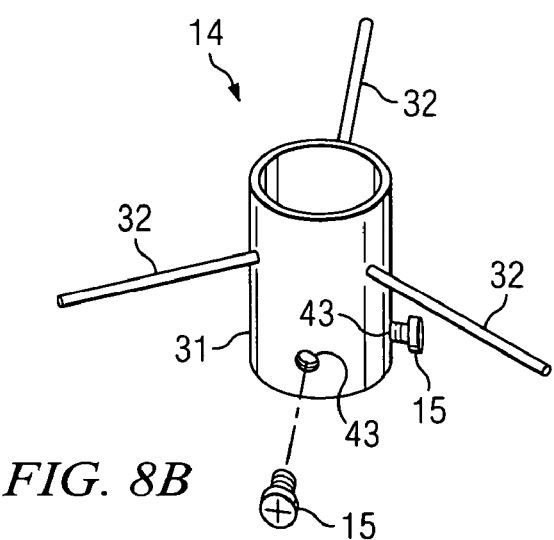
Figure 8C:
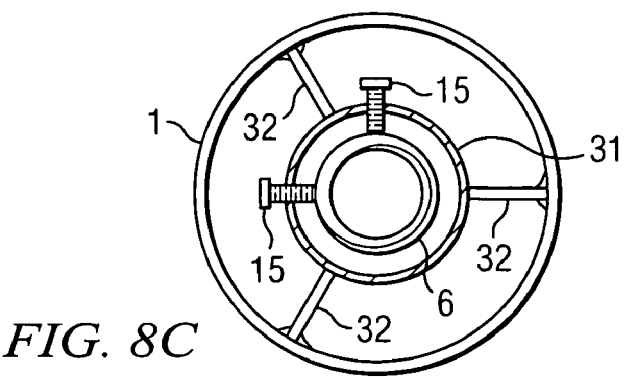

FIG. 8 illustrates the placement of pipe insulation 42 around the threaded pipe 6 and within shroud 1. In this illustration, a two-piece insulation material is utilized. Although not directly shown, this insulation material is extended to include valve 3 and the entire levels of the threaded pipe length that may be exposed to cold weather conditions. FIG. 8A illustrates a variation in assembly of the supply piping to threaded tee 7 whereby drain piping is omitted and pipe fitting plug 41 is inserted into the branch outlet of the tee. FIG. 8B shows the construction of one embodiment of stirrup 14. Stirrup braces 32 made of steel rods are affixed to stirrup collar 31. The collar is shown as a round cylinder tube of sufficient diameter to permit threaded pipe length 6 to smoothly but not loosely, pass through its center. Tapped holes 43 are positioned along the lower portion of the collar, and socket set screws are inserted into each tapped hole 43. FIG. 8C illustrates how stirrup 14 is secured to threaded pipe length 6, and stirrup 14 is welded to the bottom of the shroud at termination points of each of the stirrup braces 32. Socket set screws 15 are tightened against threaded pipe length 6, thus securing the short pipe and attached valve assembly in place.

Figure 9:
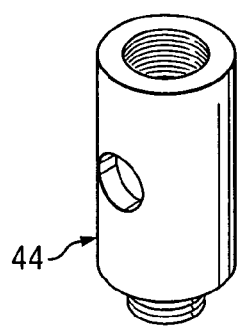
FIGS. 9, 9A, 9B, 9C, and 9D are drawings showing an alternate to prevent freezing valve assembly.
Figure 9:
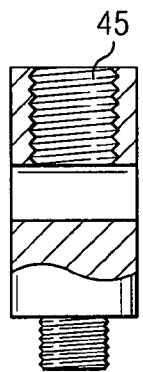
Figure 9:
Figure 9:

FIGS. 9, 9A, 9B, 9C, and 9D are drawings of components of an alternate style of a conventional valve assemble that may be used in the assembly of the Pedestal Hydrant where extreme cold weather conditions dictate that added precautions are in order. A brief explanation of this common style of valve assembly is made in order to illustrate how this style of valves is incorporated into the design of the Pedestal Hydrant. A common term for this style is "freeze-proof". FIG. 9 is a drawing of piston cylinder 44, O-ring 46 and retaining washer 47. Also illustrated is a sectional view of the cylinder 44 disclosing interior piston threads 45. There is also illustrated a round shaft along the side surface of this cylinder.

Figure 9A:
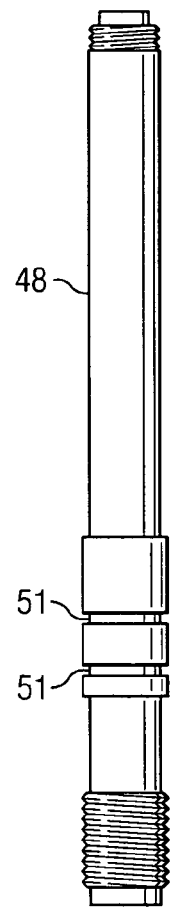

FIG. 9A discloses valve stem 48. The stem has typical coarse threads at its top. These threads will accept the nut that is secured to the stem during assembly of the hydrant. Two insert grooves 51 are positioned along the linear surface of the round valve stem. Threads typical to valve stems appear at the bottom of this stem. During assembly of the hydrant, O-ring ring 46 and retaining washer 47 will be inserted into these grooves.

Figure 9B:
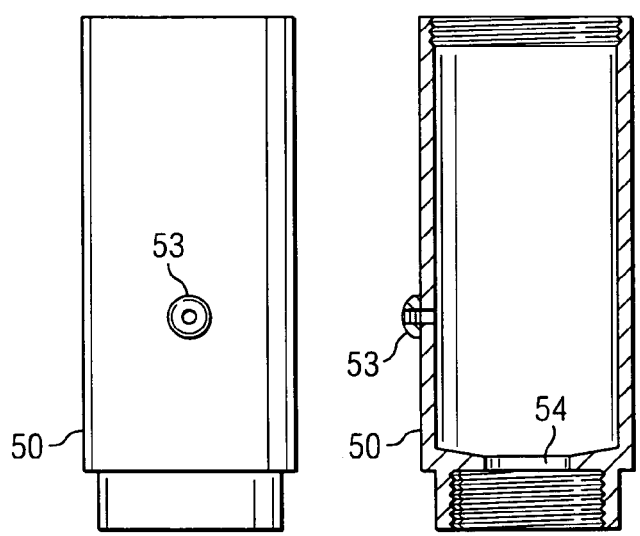
Figure 9C:
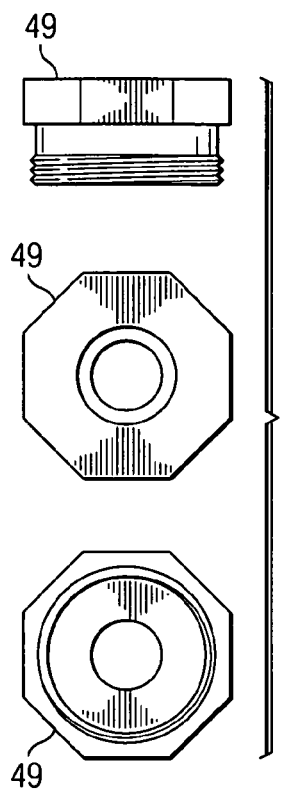
Figure 9D:
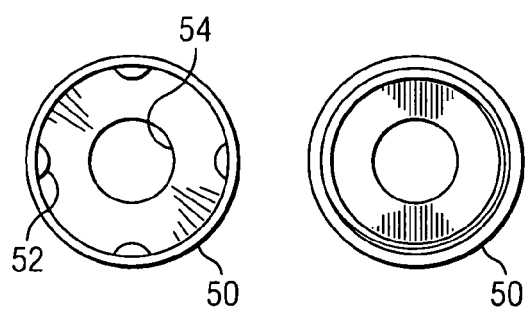

FIG. 9B is a side and sectional view of valve body 50. Drain port 53 appears at one side of the valve body, and valve seat 54 is located at the inner base of this body. The sectional view discloses standard pipe threads within the body and directly below the valve seat. FIG. 9C represents three views of retaining bushing 49. The top view shows the side of the bushing and discloses a hexagon shaped upper portion that is used to secure the bushing by using a standard wrench. Standard threads appear along the bottom of the bushing. The middle illustration is the top view of this bushing and shows a relatively flat surface. The bottom view illustrates that the base of the bushing is round with a round hole or aperture that passes along the axis of the bushing from top to bottom. The hole is without threads or other obstructions and is of sufficient size to permit a snug fit when the valve stem 48 is inserted from the bottom with O-ring 46 in place in the top insert groove 51. FIG. 9D is another view of valve body 50. The top view of the valve body is at the left, and the bottom view is at the right. Valve seat 54 appears in the top view in the center of the body along with retaining flanges 52 to be explained hereinafter. The bottom view illustrates that the bottom of this valve body is rounded.

Figure 10A:
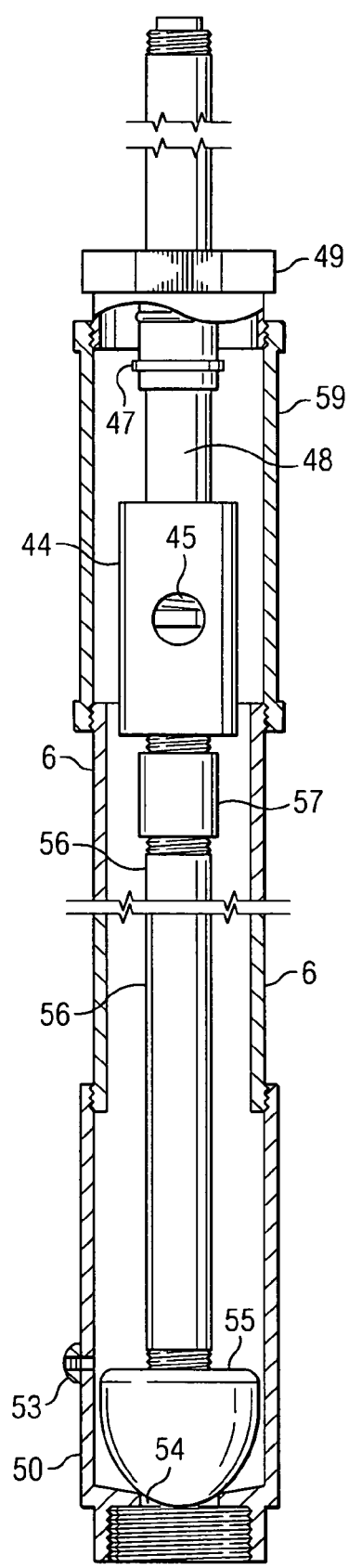
FIGS. 10A and 10B are drawings showing an alternate assembly.
Figure 10B:
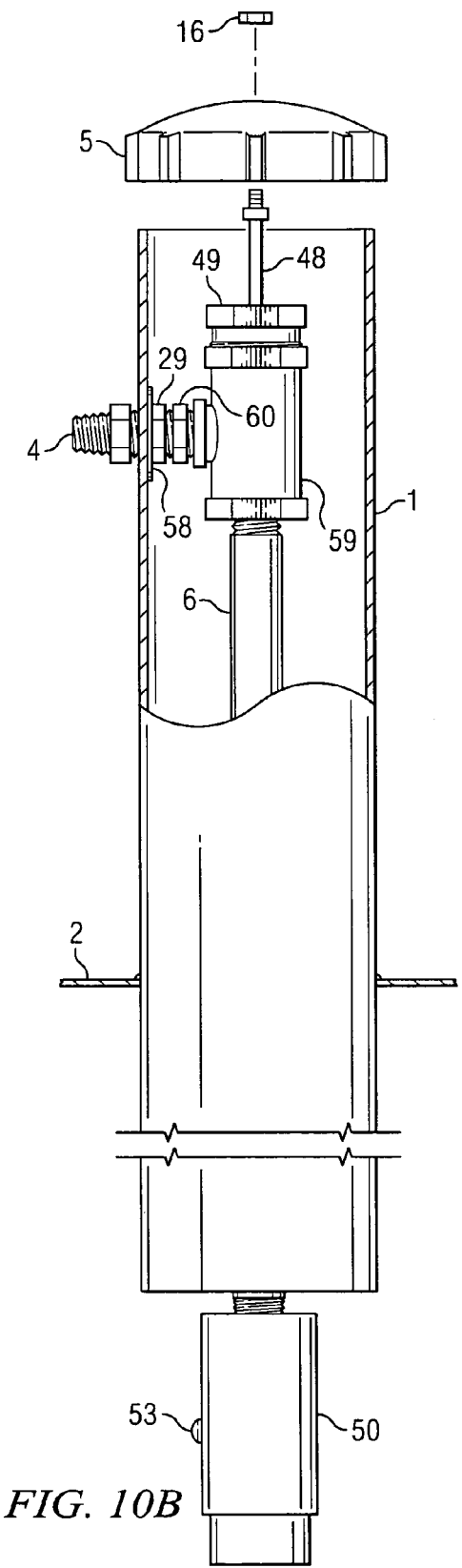

FIGS. 10A and 10B are used to explain how the valve assemble functions in the assembled Pedestal Hydrant. Beginning in FIG. 10A, it is seen that valve stem 48 has been inserted from the bottom into retaining bushing 49 with retaining washer 47. Washer 47 will prevent the stem from being pulled through the top of the assembled valve. The threaded lower portion of the stem is inserted into piston cylinder 44. The cylinder threads are visible through the round shaft in the cylinder and illustrate how the stem threads engage the cylinder. According to this embodiment, it is shown that these threads are reverse threads and are of matching style and size. A conventional threaded rod coupling 57 is threaded onto the lower outer threads that appear at the base of the cylinder. Valve guide rod 56, has conventional threads at either end, and is attached to rod coupling 57. FIG. 10A is a view of the lower portion of the valve assembly. According to this view, valve plunger 55 is attached to valve guide rod 56. The figure illustrates the assembled valve in the closed position. FIG. 10B discloses the Pedestal Hydrant fully assembled and, as shown, pipe length 6, has a larger diameter than that used in the preferred embodiment of the invention, discussed above. Pipe length 6 also spans the distance between the valve body 50 and threaded tee 59. The valve stem assembly comprises a valve stem 48 and retaining bushing 49, as well as piston cylinder 44 (not shown). A combination of the O-ring 46, retaining washer 47, rod coupling 57, valve guide rod 56, and valve plunger 55, as shown in FIG. 10A is inserted into the threaded tee from the top side and extends through pipe length 6 extending to the valve body at the base. The bushing is tightened securely into place in the end outlet of the threaded tee.

When operating the Pedestal Hydrant, the user turns dome handle 5 to open the valve and permit the flow of water. Because of the reverse threads on both the valve stem and valve cylinder, the shaft and the valve plunger are drawn upwards permitting water to enter the chamber that is created within the threaded pipe length 6 and between the valve body and upper tee and bushing. The round shaft in the valve cylinder enables water to easily flow out the side outlet of the threaded tee.

A threaded bushing 60 is inserted into this outlet to reduce the flow. The same assembly as shown in FIG. 4 is utilized to provide hose threads at the exterior of shroud 1. Hose fitting vacuum breaker 4 appears on the outer surface while hose adapter 29 and gasket 58 remains concealed within the interior. In FIG. 10B, stem securing nut 16 is shown above dome handle 5.

Once the valve is closed by turning the handle in a direction opposite to that for opening the valve, the valve stem assemble with the plunger are driven down against the valve seat, thus stopping the flow of water. Drain port 53, which was obstructed during the open state of the valve now becomes unobstructed, thus permitting the draining of all water that remains after the valve has been closed. The retaining flanges 52 discussed above holds the valve plunger away from the sides of the interior of the valve body so as to permit water to pass along its sides.

A significant difference between this "freeze-proof" valve assembly and other typical styles of a conventional "freeze-proof" valve assemblies are in the use of a threaded tee comprising the upper portion of the completely assembled valve. In this alternate embodiment of the Pedestal hydrant, the valve assembly appears within a confined enclosure or shroud, such that it is necessary to extend the outlet side of the valve to beyond the surface of the shroud. Typical "freeze proof" valves would be fitted with a hose fitting body rather than a threaded tee.

Figure 11:
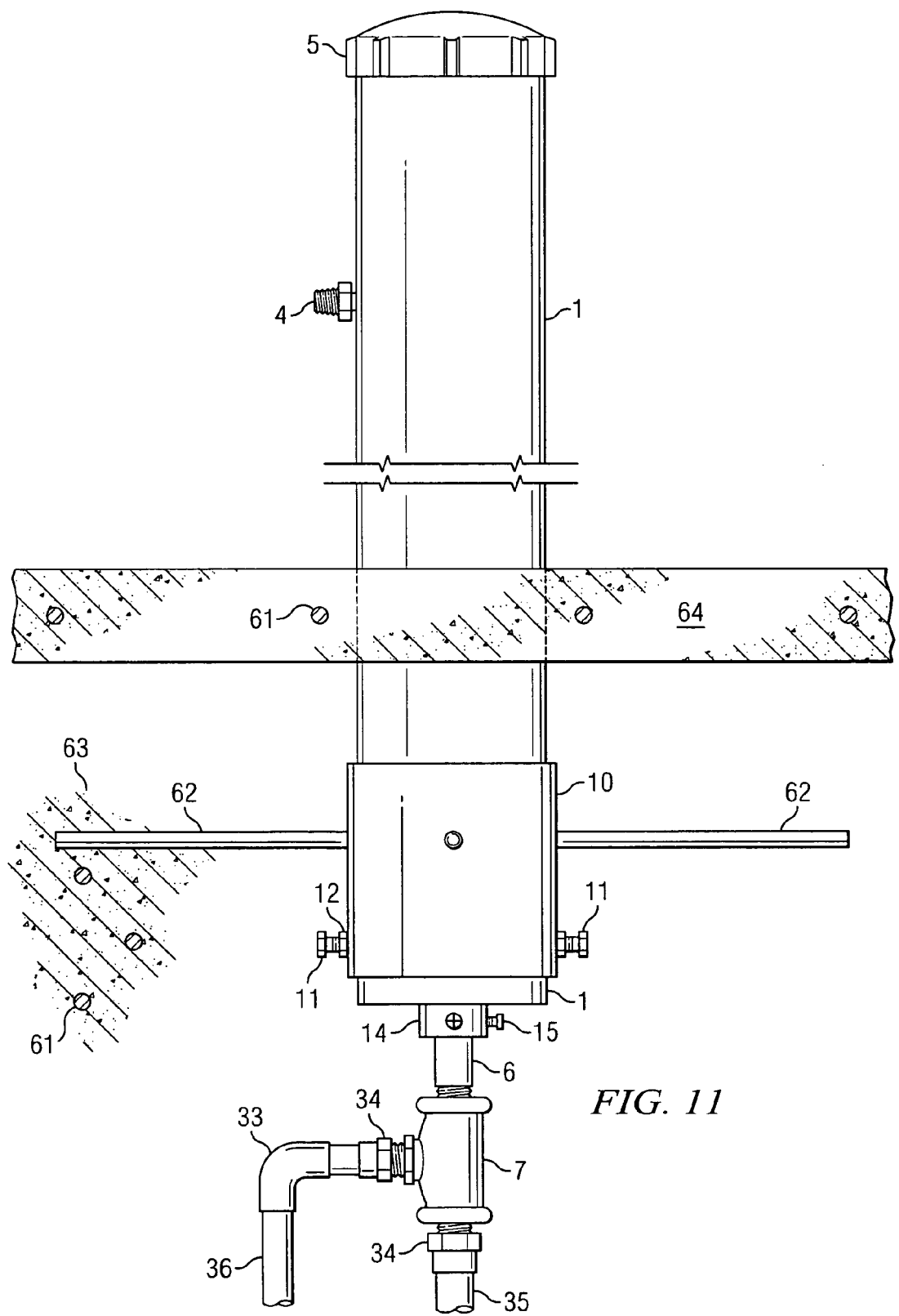
FIG. 11 shows still another embodiment of the invention.

FIG. 11 details another use for the Pedestal Hydrant. In this FIG., all components are as indicated in the embodiments discussed above. However, this embodiment is used when the hydrant is located in either landscaping or other traffic areas. In such an arrangement, the portion of the hydrant that would typically appear below the roofline will be positioned below the ground surface. Thus, the under-deck flange has been omitted and under-deck cylinder 10 has been modified. Steel anchoring bars 62 are securely welded in place at each side of the cylinder. In the illustrated embodiment, the Pedestal Hydrant has been placed within a concrete walkway 64 that has steel reinforcing bar. Then, prior to backfill of the dirt material, Anchoring concrete 63 also having steel reinforcing bars 61 is poured into place at the ends of each steel anchoring bar.

Water supply piping 35 is connected below ground to the inlet of threaded tee 7. Drain piping 36 may be either extended to a more remote location or omitted in its entirety. The technique to secure threaded pipe length 6 to the hydrant is also utilized in this embodiment. Socket wing nuts 15 are tightened at stirrup 14 against the threaded nipple 6.

Figure 12:
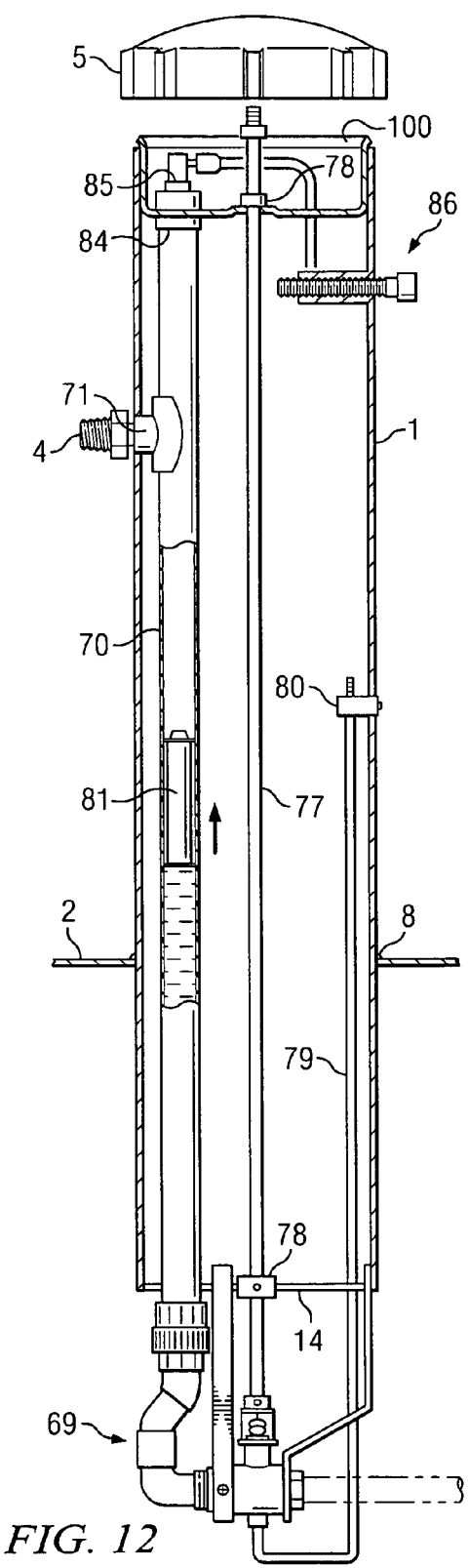
FIG. 12 is a cross-sectional view of a freeze proof embodiment of the invention.

Another embodiment of the present invention eliminates the requirement for either a gravity flow drain system or a reservoir storage tank. As shown in FIG. 12, this embodiment of the pedestal hydrant includes common elements with the embodiments discussed with respect to FIGS. 1-11, and carries common reference numbers. As shown, there is a stainless steel shroud 1a, a stainless steel base 2, and a dome handle 5. As illustrated, however, valve assemble 69 is positioned below the shroud 1 and the area exposed to freezing weather. Valve actuator shaft 77 extends from the handles to the valve assemble 69 so as to permit operation of the valve. When valve assembly 69 is opened, water or liquid flows into a stand-pipe 70. Stand-pipe 70 has a slick, unobstructed interior that allows cylinder plunger 81 to move vertically within the stand-pipe 70. Although any type of piping having a smooth inner surface will suffice, for this specific application, schedule 40 PVC pipe has been found to be particularly suitable. Stand-pipe 76 extends from the valve assembly 69 and to threaded adapter 84 and is positioned directly above pipe saddle 71. Discharge of the fluid or water occurs through hose fitting vacuum breaker 4. Other components of this assembly have previously been described or shown, and therefore, no further remarks are necessary since they function in the same manner as discussed above.

Stand-pipe 70 includes threaded adapter 84 and threaded plug 85 so that in the event service is required for the hydrant assembly there is an access to the interior of the pipe. Additional components and their function related to FIG. 12 will be described hereinafter. Pipe saddle 71 is attached to stand-pipe 70 over a hole that penetrates stand-pipe 71. Although other methods of providing a fluid or water flow outlet may be suitable, this method is preferred in lieu of a conventional socket welded tee since this method eliminates uneven or rough interior surfaces within the stand-pipe 70 that might restrict the free movement of the plunger 1. Saddle 71 is preferably attached to stand-pipe 70 by means of fusion welding.

Figure 13A:
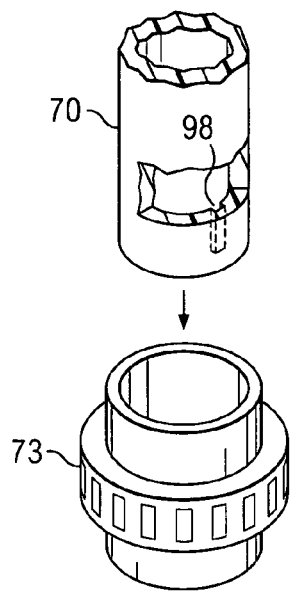
FIGS. 13A, 13B, and 13C are detailed views of the embodiment of FIG. 12.
Figure 13B:
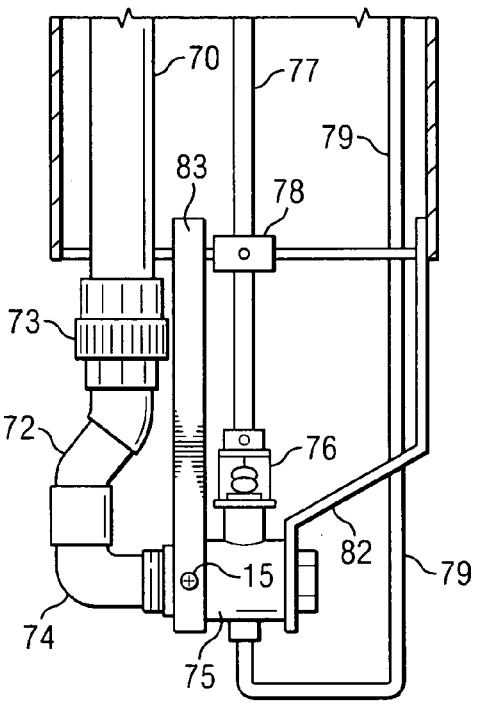

Details of the valve assembly 61 are discussed with respect to FIGS. 13A and 13B. A component of valve assembly 69 is threaded ball valve 75, which is typically a conventional one-quarter turn valve with a drain-down or vent port that permits water remaining in the up-stream side of the valve, to be evacuated from the piping when the valve is closed. A valve socket harness 82 may be constructed of formed and punched sheet metal and, as an example only, permits the hexagon shape of the valve's inlet to fit snugly in a punched hexagon shaped hole. Valve saddle harness 83 may also be made of sheet metal formed to cradle or accommodate the hexagon shape of the valve discharge side. As an example only, a socket set screw 15 is inserted into the side of the saddle through a threaded and tapped hole to secure the valve to the harness. As shown by illustration, the upper portions of harness 82 and 83 extend to the bottom of the shroud where they are attached by welding. Other ways to connect or secure this valve assembly to the piping and shroud include bolt assemblies incorporated with the ball valve during manufacturing and other conventional techniques used in the industry to attach piping to structures.

As an example only, the piping components of valve assembly 69 may consist of a threaded adapter elbow 74 inserted into the outlet side of the valve, two (2) offset fittings that allow for the piping arrangement to constantly conform to the actual dimensional size of the shroud, and a union 73. As is further illustrated in FIG. 13A, the union 23 is a conventional pipe union that comprises the connection between stand-pipe 70 and the remainder of the valve assembly 69. Drain relief groove 98 illustrated in FIG. 13A is a thin notch in the inner surface of the stand-pipe at the connection point to the union. The purpose of groove 98 is to permit the passage of water remaining in stand-pipe 70 beyond cylinder plunger 31 to pass into the lowest portion of stand-pipe 70. This feature avoids any freezing of water that may remain within the stand-pipe 70 or discharge piping 79 after the cylinder plunger 81 has completed its downward travel as will be discussed hereinafter.

Referring again to FIG. 13A, discharge piping 79 is connected to a drain-down port of the valve 25. It will be appreciated by those skilled in the art, that unlike conventional applications, drain down or discharge pipe 79 extends vertically and upward away from valve 75.

Figure 13C:
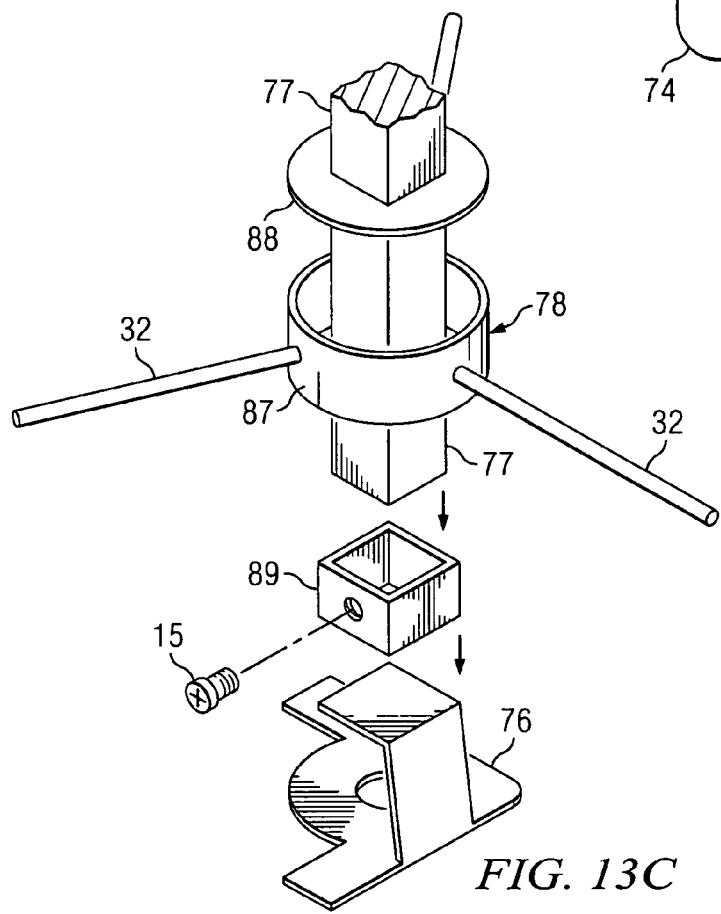

FIG. 13C also describes the assembly and function of a transition guide 76. A conventional ball valve 75 is typically equipped with a lever or operating handle attached to the operating portion of the valve. According to the present invention, however, a shaft is used in lieu of a lever handle, and therefore, a means for transition is included. The guide 76 comprises a portion of formed sheet metal that is center punched at the base in a shape conforming to the ball valve as necessary for attaching guide 76 to the body of the valve 75. To permit the securing guide 76 by a conventional nut and washer to a treaded shaft; the guide is designed so as to provide a raised platform. This design allows for securing of the nut and washer onto the threaded shaft of the valve. Transition cup 89 is attached to the top of this guide by a permanent means, such as by welding. Once in place, this assembly allows for insertion of valve actuator shaft 77. Although, this shaft is preferably formed from conventional square stock, of course, it may be formed from stock having other shapes (such as round) if machining of the stock at specific points is required. However, in each case, the shaft is sized to fit within the cup 89 and is of a length that permits an extension from the dome handle 5 to the valve assembly 69. The top of shaft 77 is machine threaded to a size to accommodate the use of a threaded nut for securing the dome handle 5 for operation of the shaft valve 75.

Also illustrated is shaft sprocket assembly 78a comprising pivot cup 87 that has three (3) stirrup braces 32 attached at equal spacing along the outer sides. Sprocket 78 is round in form with a bottom plate that has at its center a hole sufficient to accommodate the turning of shaft 77. A square to round guide 88 is press-fitted around shaft 77 so that the assembly will rest within the trough of the pivot cup 87 to allow free turning of the shaft 77. Connection of sprocket assembly 78 to the shroud 1 is performed similarly to the method discussed above with respect to FIG. 8C.

Figure 14A:
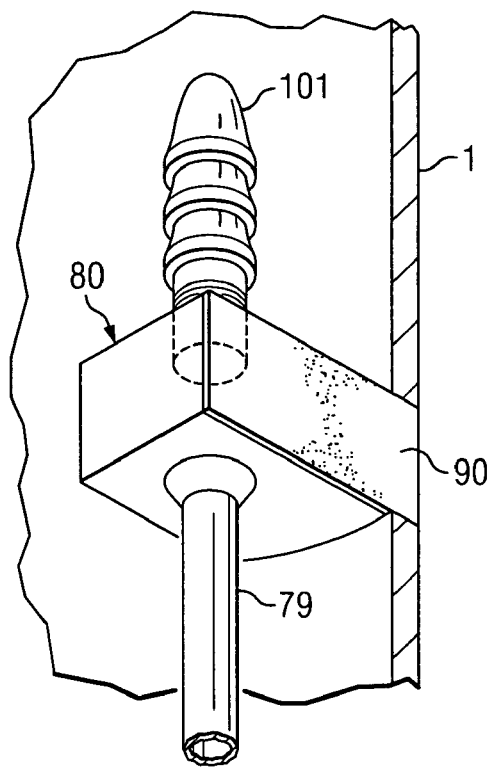
FIGS. 14A, 14B, and 14C are additional detailed views of the embodiment of FIG. 12.

Referring now to FIG. 14A, there is illustrated how piping 79 is terminated. As shown, this piping 79 terminates at discharge housing 80. Housing 80 is preferably comprised of sheet copper that is formed, shaped, sealed and tapered to allow for fluids entering from an inlet tube to discharge out through the open face of this housing by means of gravity flow. Similarly, this housing may be constructed of other materials such as sheet steel, stainless steel, pre-formed copper fittings, and plastics. A corresponding and same size opening is provided in the shroud. Barbed tubing adapter 101 is inserted or otherwise affixed into the top of the housing for connection of discharge tubing to be described hereinafter. The housing may be attached to stainless steel shroud 1 by gasket 90. As shown, gasket 90 has double side adhesive to permanently attach the housing to the shroud.

Figure 14B:
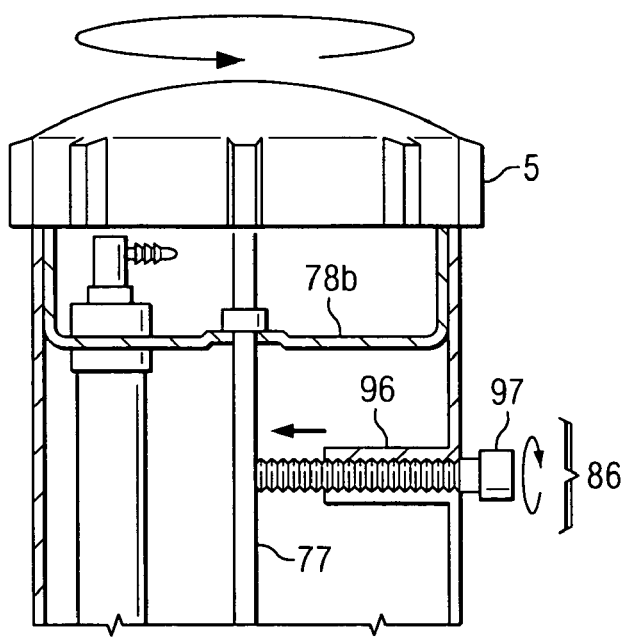

FIG. 14B illustrates how dome handle 5 is attached to valve actuator shaft 77. A second shaft sprocket 78b is positioned at the upper section of the shroud to provide support while permitting the free turning of the handle. Also illustrated is an optional lockdown assembly 86. Assembly 86 comprises a threaded collar 96 that is permanently attached and sealed to the shroud 1. Set screw 97 turns within collar 96. Turning screw 97 will force the end of screw 97 against the shaft 77. This prevents the handle 5 and shaft 97 from operating the ball valve 75. This lock down assembly embodiment of the hydrant provides a vandal-proof feature since the operation of the valve would be restricted to maintenance personnel having a wrench or other device that can turn the set screw 95.

Figure 14C:
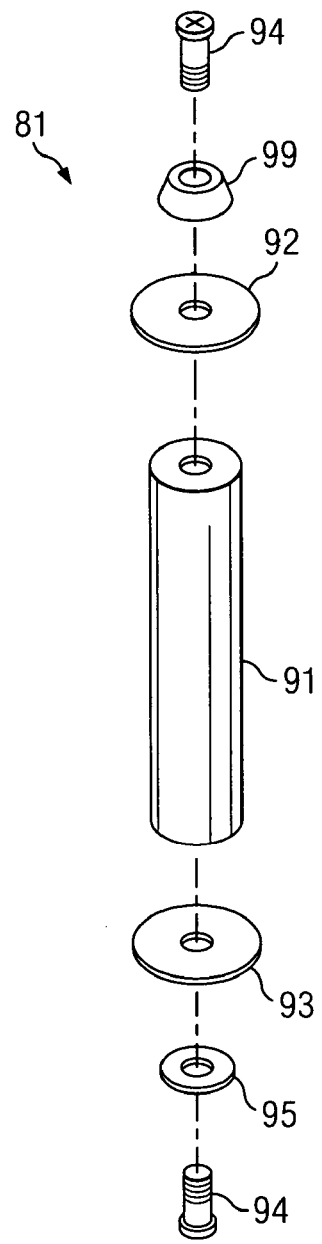

FIG. 14C illustrates the details of cylinder plunger 81. Plunger 81 is comprised of plunger shaft 91 that is preferably made from round stainless steel stock having a length and width that allows the shaft to move up and down within the stand-pipe 70. The weight of plunger shaft 91 is selected to enable gravity forces to displace a corresponding weight of standing water remaining in the stand-pipe. Each end of this shaft is drilled and tapped to allow a machine screw 94 to be received in a threaded hole. Screws 94 at either end of the shaft secure upper gasket/washer 92 and lower gasket/washer 93 to the plunge shaft 91. These gasket/washers are of a size and construction that provides for sealed movement of the plunger assembly 91 within pipe 70. The gaskets also restrain movement of plunger 81 when the valve assembly 75 is in the open position. The lower gasket is preferably of a thinner and more flexible material than the upper gasket. The lower washer is held in place by a screw 94 and washer 95. The upper gasket may be stiffer and less flexible and held in place by a screw 94 along with rubber bumper-washer 99.

Figure 15A:
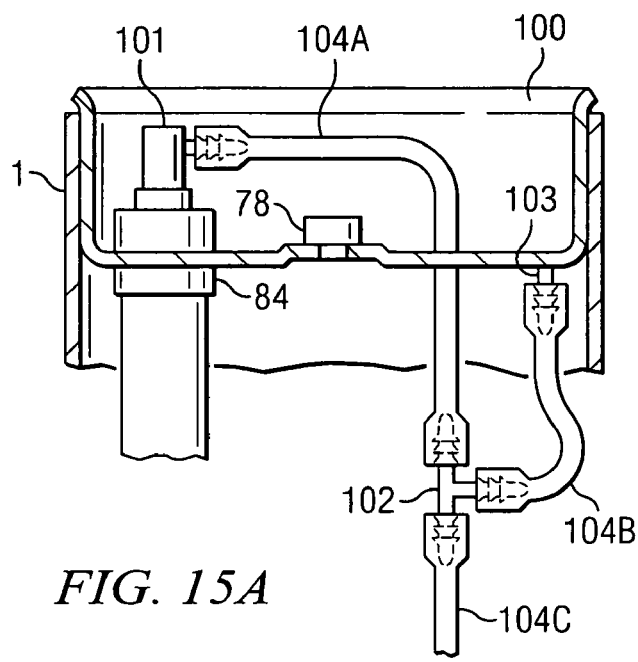
FIGS. 15A and 15B are further additional views of the embodiment of FIG. 12.

Referring now to FIG. 15A there is shown drain cup assembly 100, which collects fluids that may escape the stand-pipe during routine maintenance, or alternately collects rain water that may incidentally enter the cavity of the shroud. As shown, cup assembly 100 is a formed bowl that has an upper lip so as to permit the resting of the upper rim of the cup onto the top edge of the shroud. An aperture permits the stand-pipe 70 and threaded adapter 84 to pass from the bottom side of cup 100 to the inside of the cup. A second hole or aperture allows drain tubing 104 to pass downward through the base of the cup. Shaft sprocket 78b is attached to the center point of this cup, and barbed bulkhead fitting 103 is attached to the base of the cup. All points of penetration in the surface of the bowl of this cup are sealed against leakage of fluids that might collect within the cup assembly 100. As shown, barbed tubing adapter 101 is threaded into the top side of threaded adapter 84. Drain tubing 104a connects from this barbed adapter, through the cup bowl to a barbed tubing fitting 102 just below the cup assembly 100. In turn, drain tubing 104b extends to the bulkhead fitting 103 and drain tubing 104c connects to the discharge housing.

Figure 15B:
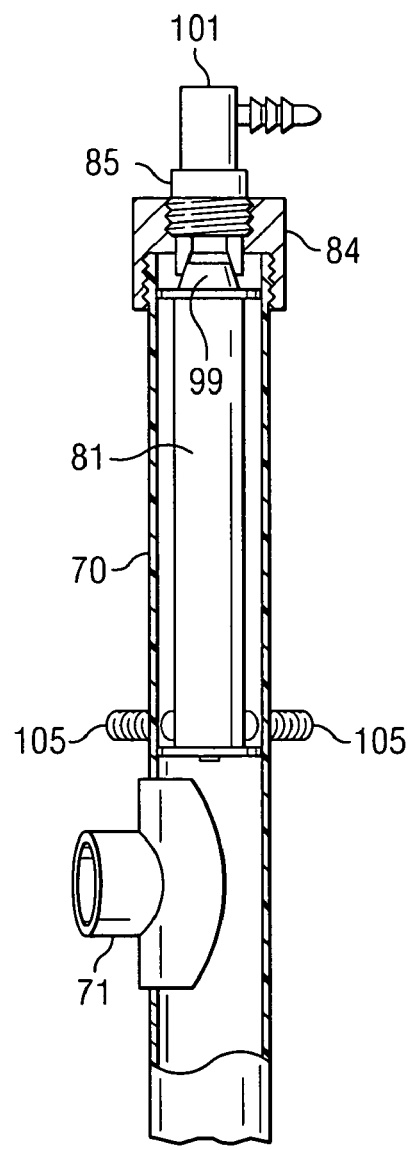

FIG. 15B illustrates the operation of cylinder plunger 81 and threaded adapter 84. The threaded adapter 84 is attached to the top rim of stand-pipe 70, and threaded plug 85 is connected to adapter 84. Plug 85 is modified from its original form to include an extension to the lower portion with a beveled shaped base surface and round aperture extending from the base surface upward to the top surface of aperture 84, which includes threads to receive the barbed tubing adapter 101. As also illustrated, when plunger 81 is at the highest position of its travel, rubber bumper-washer 99 will lodge and rest against the beveled shaped base surface. This provides a watertight seal between the stand-pipe and the drain tubing as the cylinder plunger 81 comes to rest against plug 85. When plunger 81 is resting against plug 85, the bottom of the cylinder plunger is positioned above the outlet of the stand-pipe 70 created by pipe saddle 71. In another embodiment, stand-pipe 70 may include two opposing retaining pins 105. Pins 105 are conventional ball spring plungers and are positioned and adjusted so as to momentarily retain the downward travel of the plunger. The balls of these plungers bear against the surface of the plunger 81 so that the downward momentum of the shaft will be delayed. This allows a portion of the water standing within the stand-pipe to escape via gravity flow out through the discharge housing. To provide more resistance against downward motion of the plunger 81, the shaft 91 may be scored or roughed where it is in contact with the balls of retaining pans 105.

Figure 16A:
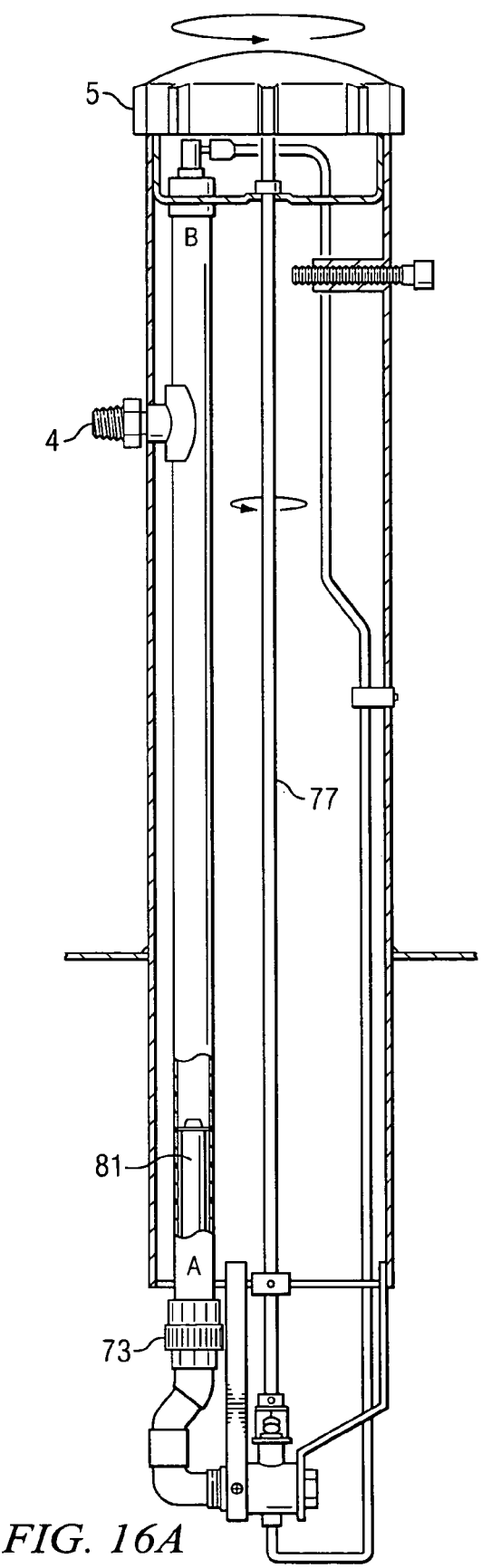
FIGS. 16A, 16B, and 16C, and FIGS. 17A, 17B, and 17C are additional cross-sectional views illustrating the operation of the embodiment of FIG. 12.
Figure 16B:
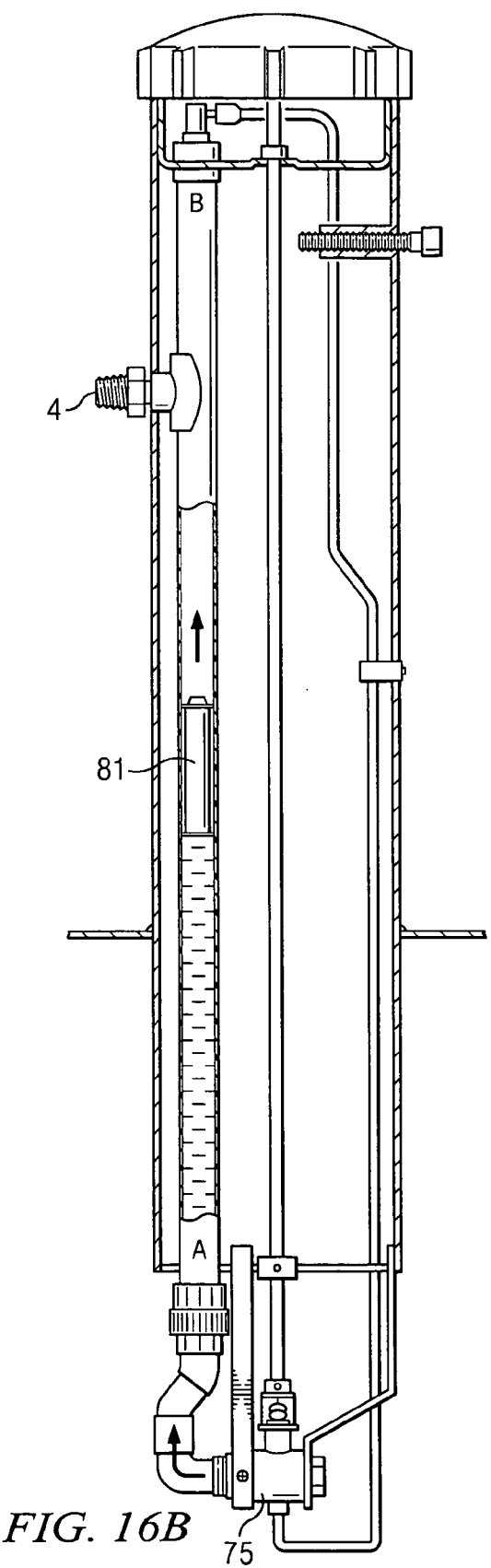
Figure 16C:
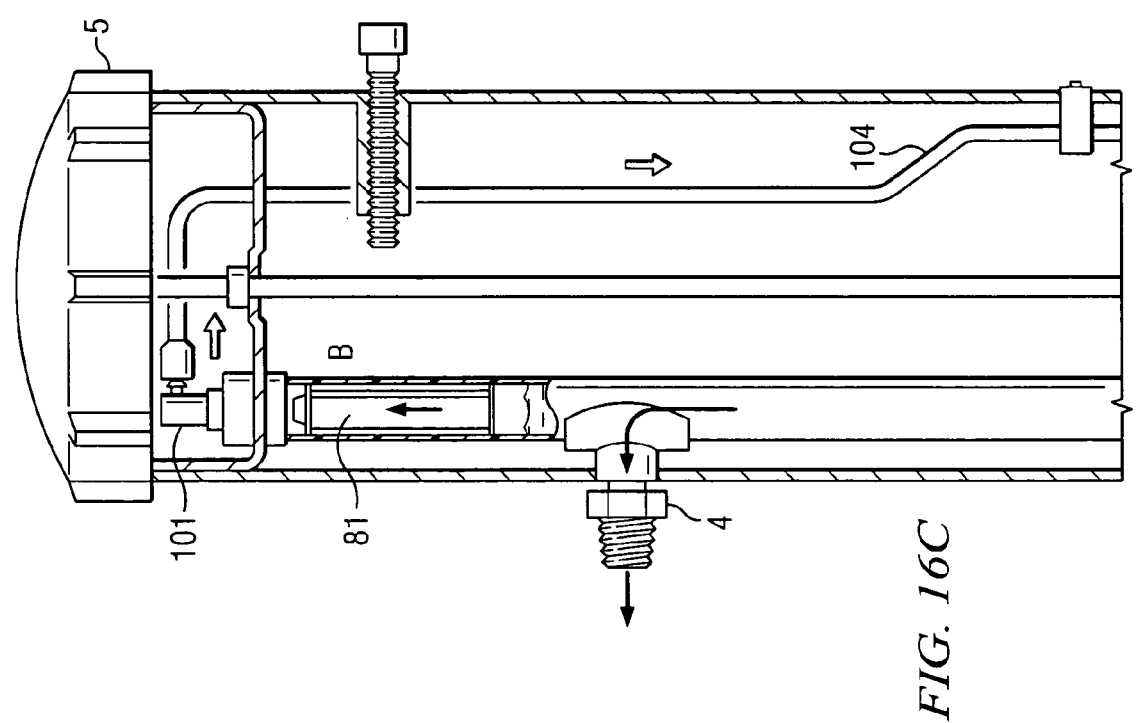

As illustrated in FIG. 16A, rotating dome handle 5 to open valve 75 causes the gate within ball valve 75 to move to the open position allowing water to pass through its port. Cylinder plunger 81 initially rests against union 73. Then, as shown in FIG. 16B, as a fluid fills the stand-pipe 70, the force and flow of the rising water or fluid causes plunger 81 to rise within stand-pipe 71 due to the fluid pressure. As shown in FIG. 16C, once fluid or water flow reaches the outlet at hose fitting vacuum breaker 4, plunger 81 is lodged against and remains positioned in that portion of the stand-pipe that extends above the outlet. During the upward travel, air that is present in the stand-pipe is discharged ahead of the flowing water up to the outlet. As the plunger reaches and begins to pass above this outlet, the remaining air pass through drain tubing 104 and escapes out of the assembly at the discharge housing. The pressure of the fluid traveling within the stand-pipe and exiting through the hose fitting along with the resistors of the restraining pins 105 and the upper and lower gaskets of the plunger 81 causes the plunger to remain in place.

Figure 17A:
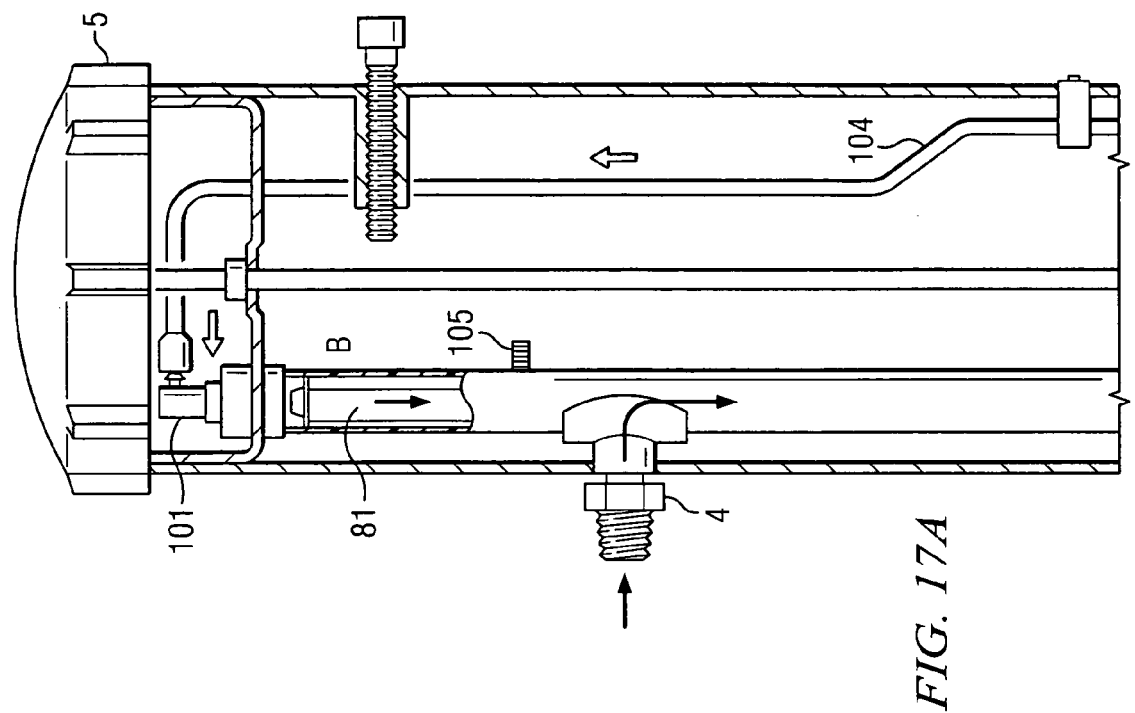

Then, as shown in FIG. 17A, turning the dome handle 5 to close the ball valve of course causes the flow of fluid through the hose fitting to cease. Since the fluid will seek a consistent level, the water or fluid located at a level above the discharge housing will begin to flow out of the assembly. During a brief period, the plunger 81 remains in position above the outlet. The combination of the resistive dynamics of the flexible gasket/washers of cylinder plunger 81 and the restraint applied to the cylinder by the opposing restraining pin 105 illustrated in FIG. 15B, which retrains the plunger 81 above the outlet for the brief period. Although only a single restraining pin 105 is shown in FIG. 17A, a pair of opposed restraining pins as shown in FIG. 15B are preferred. This period allows the water within the stand-pipe to gravity flow out of the pipe.

Figure 17B:
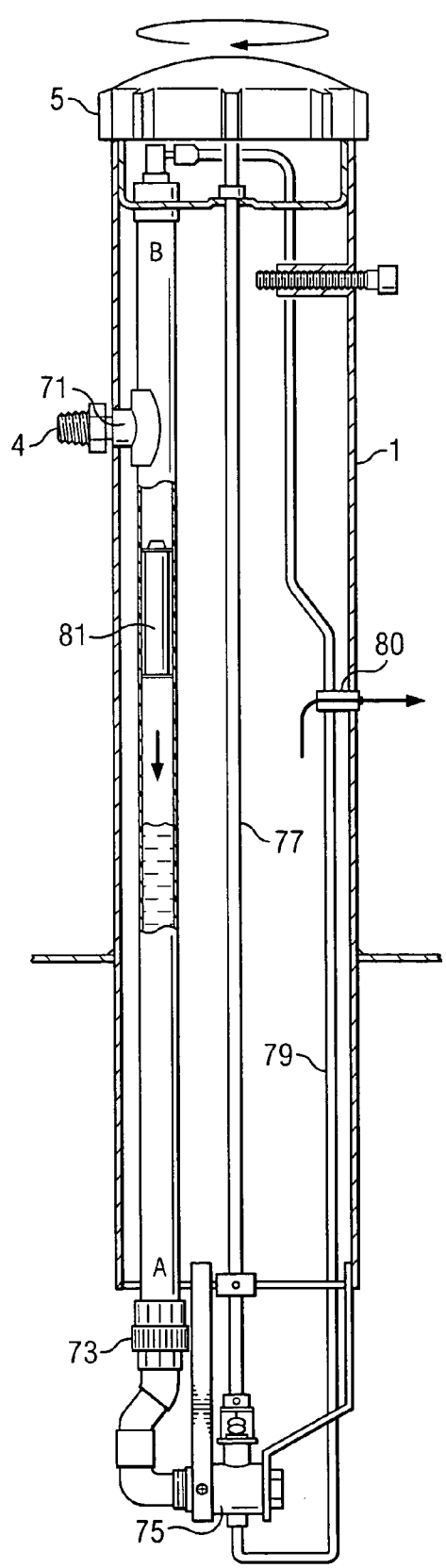

However, as shown in FIG. 17B, after the short period of time resulting from the resistance of the restraining pins 105 and that allows for the upper and lower gaskets of the plunger 81 to become inverted, the plunger 81 will begin falling downward. Because of the sealing feature of the gaskets against the internal side of the stand-pipe 70, the fluid is forced in front of the plunger 81 as gravity pulls it towards its original position. As the plunger 81 continues downward, the fluid and trapped air in front of the plunger is forced to discharge through the drain port of the ball valve 75, through discharge piping 79. Eventually, the fluid reaches discharge housing 80 where it freely flows out of the housing onto the surface below.

Figure 17C:
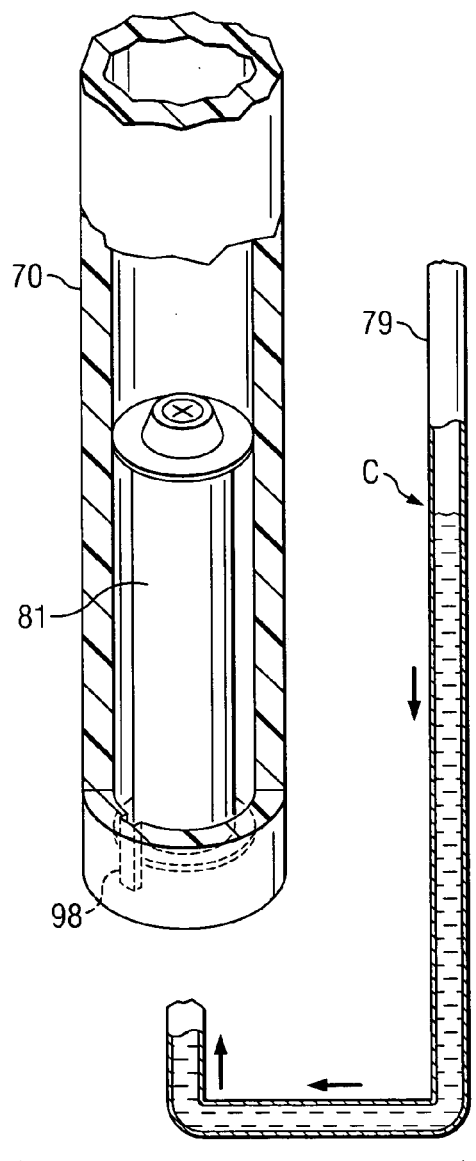

The majority of the water or fluid that remains in the stand-pipe 70 after the valve 75 is closed will be evacuated out through the discharge housing 80. After the valve is closed and the plunger returns to its lowermost position in the pipe, there is the potential that a small amount of fluid may remain in discharge piping 79 at an elevation that is subject to freezing. Consequently, it is necessary that this remaining fluid is present only below the potential freezing area. As shown in FIG. 17C, upon settling of the plunger 81 at its lowermost position drain relief groove 98 discussed above with respect to FIG. 13 allows any fluids that may remain within the discharge piping to bypass the gasket/washer of plunger 81 and the fluid to the lower portion of stand-pipe 70.

Thus, in summary, it is seen that the normal upward flow and delivery of the fluid caused by the opening of the ball valve forces the cylinder plunger 81 upward to a triggering position. Upon removal of the force of the flowing fluid, the plunger moves in a downward direction. The cylinder's gaskets pressing against the inner surface of the stand-pipe forces any fluid remaining within the stand-pipe to be evacuated thus eliminating the risk of freezing weather from causing damage to the hydrant assembly.

The forced evacuation of the remaining fluid eliminates the need to provide added discharge piping or a reservoir tank to collect fluid upon the closing of the hydrant valve.

FIG. 18 illustrates still another embodiment of the invention. As shown in FIG. 18, actuation of the valve assembly can be offset to one side of the shroud. In this embodiment, the dome handle serves as a water shed. Valve operation is achieved by the inclusion of a different valve operating assembly 107 and use of valve key 106. This operating assembly is similar to the conventional design for a common valve and consists of a stem bonnet or packing nut that is affixed by threading into a round hole in the top flat surface of the dome. The stem of the loose key type requires a key to operate the stem. This stem is attached to the actuator shaft by conventional bolting, thus allowing for the turning of the loose key fitting to operate the valve located below.

FIG. 19A illustrates yet another embodiment wherein a compression type valve is used in the assembly. The compression valve with an auto-drain feature is used in lieu of the threaded ball valve described above. Auto-drain stop valve 108 is attached to the base of the shroud in similar fashion as discussed above. A similar valve socket and harness is then used with ball valve 75 shown in FIG. 13B including valve stirrup 119. The harness is formed from sheet metal and is incorporated into the attachment between valve stem packing nut 112 and the body of the valve. Although not shown, conventional flat fiber washers located between these components aids in the water tight seal of the nut to the valve body. Valve stem 113 terminates above the valve body with a square shape. Square rod coupling 114 uses two (2) Cotter pins 118 to attach this stem to the valve actuator shaft 77.

Valve stem 113 is conventionally fabricated whereby the turning of this stem clockwise causes the inner threads of the stem to rotate onto opposing threads within the packing nut, thus lowering the stem with the attached stem plunger 111. The stem and plunger when fully extended rests against lower valve seat 116, blocking fluid from entering the valve through threaded valve inlet 109. Upper valve seat 116 prevents fluid from leaving the valve body through drain port 110 when the valve is in the open position. Fluid is delivered down-stream through threaded valve outlet 115 when the valve is opened. In this embodiment, union 73 with stand-pipe 70 and the remainder of the assembly, as discussed above, is affixed to this outlet.

Figure 19B:
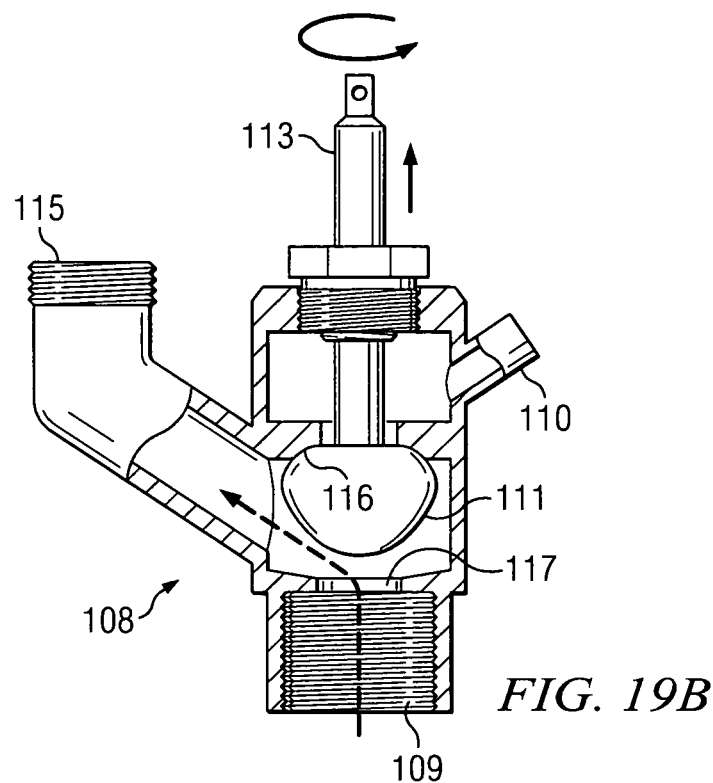

Turning to FIG. 19B, the valve 108 is illustrated in the open position. As shown by the arrow, flow originates at the inlet, passing through the body and out through the threaded outlet. The stem plunger is drawn upward and blocks access of the fluid to the drain port 110.

Figure 19C:
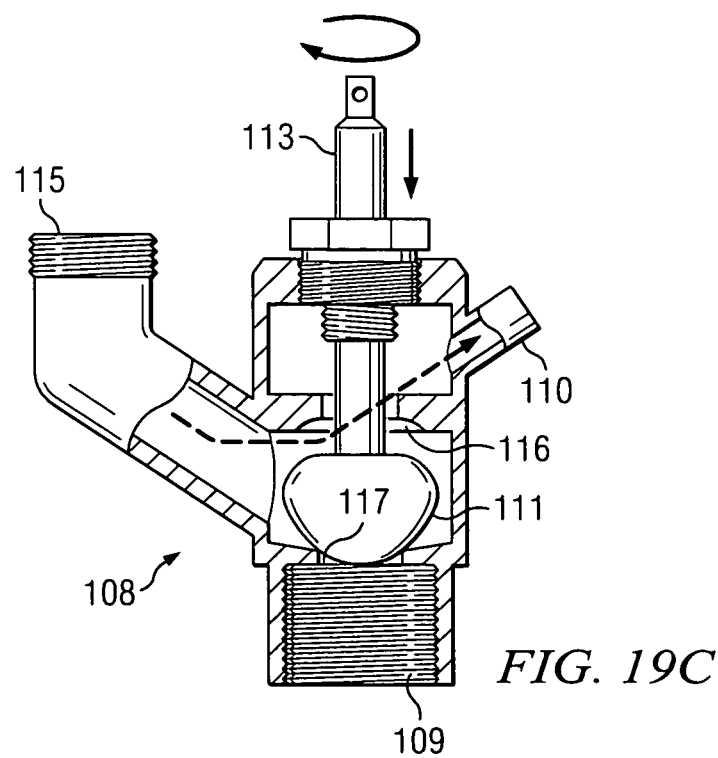

As illustrated in FIG. 19C, closing of the valve moves the plunger 111 against the lower valve seat 117, thus blocking incoming flow. The upper port 110 is now opened, allowing the fluid that remains in the stand-pipe 70 to discharge through the drain port 110, into the drain pipe (not shown). Ultimately this fluid is evacuated into the atmosphere at the discharge housing.

Figure 20:
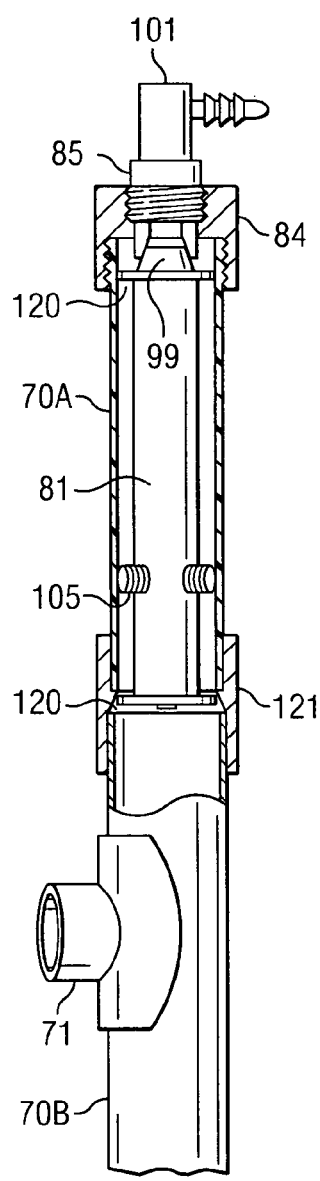
FIGS. 20 and 21 illustrate two additional embodiments of the invention.

Another embodiment, as illustrated in FIG. 20, of the invention repositions a pair of restraining pins 105 onto the cylinder plunger 91. In this embodiment and as illustrated, the upper portion of the stand-pipe 70A is separated from the remainder of the stand-pipe 70b by pipe coupling 121. A slight distance between this upper and lower section as well as an area above at threaded adapter 84 creates reversing pockets 120. These pockets permit the two gasket/washers 92/93 to re-align themselves for the downward travel after the valve assembly is turned to the OFF position. The upper portion 70a of the stand-pipe has an inner diameter slightly smaller than the lower portion 70b so as to permit the two retaining pins to perform their resistance to motion only when in this upper position.

Figure 21:
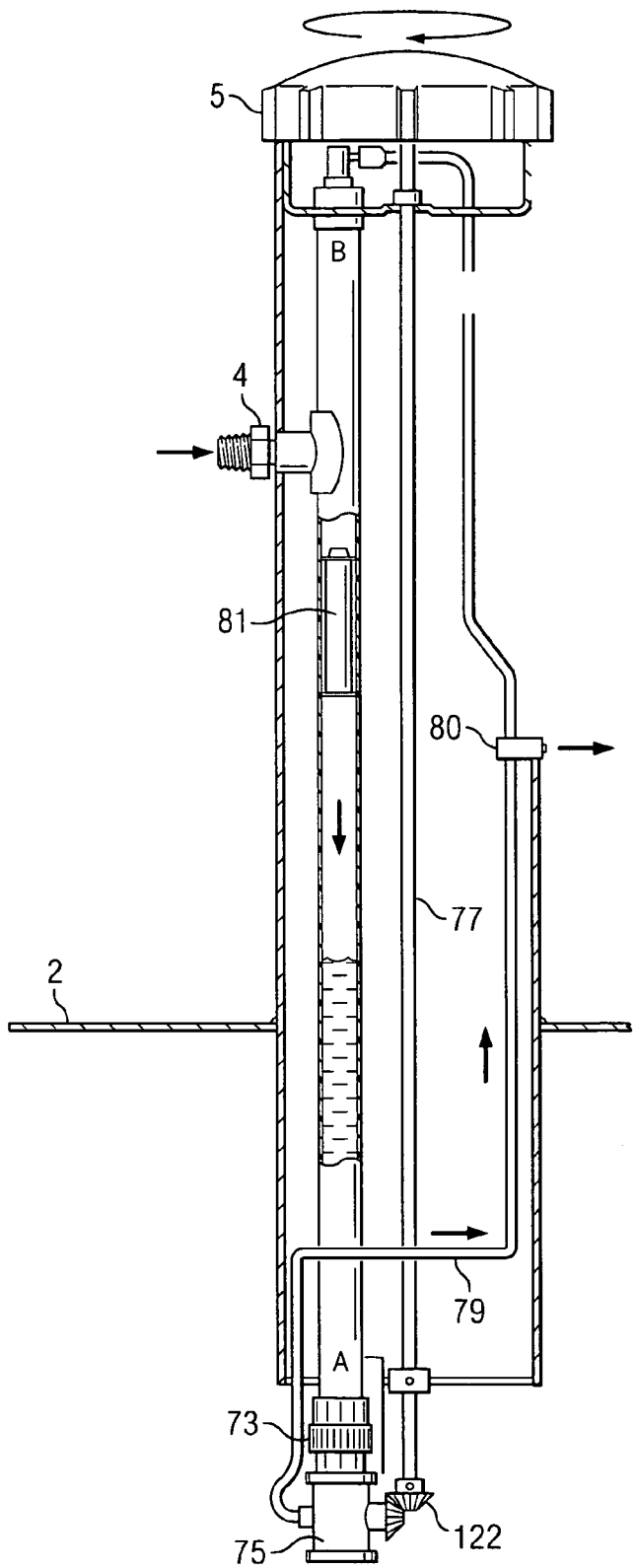
Figure 22:
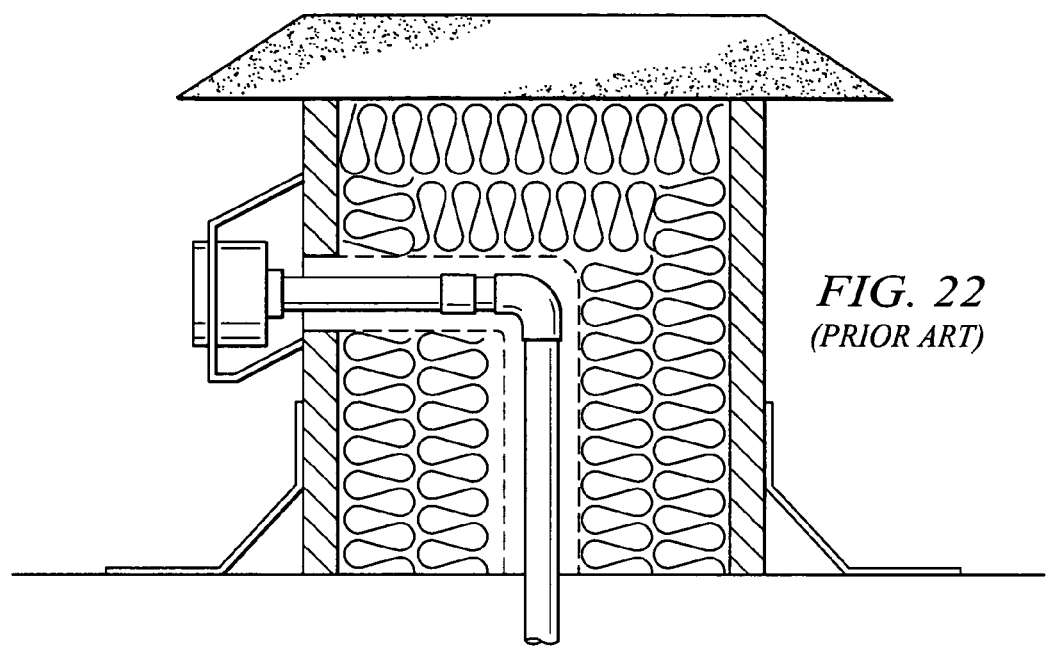
FIGS. 22, 23, and 24 illustrate prior art examples of installing a water hydrant on a roof.
Figure 23:
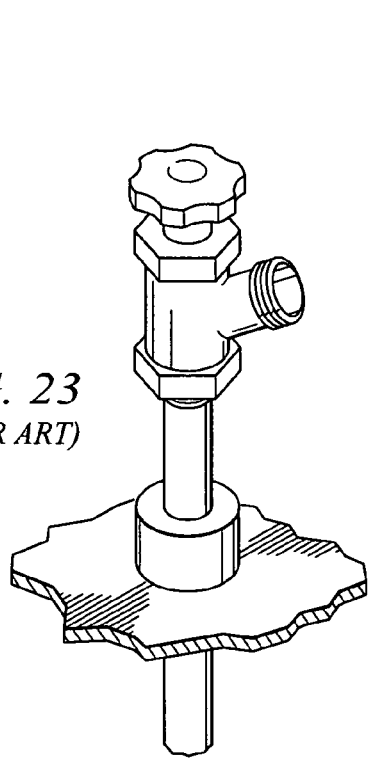
Figure 24:
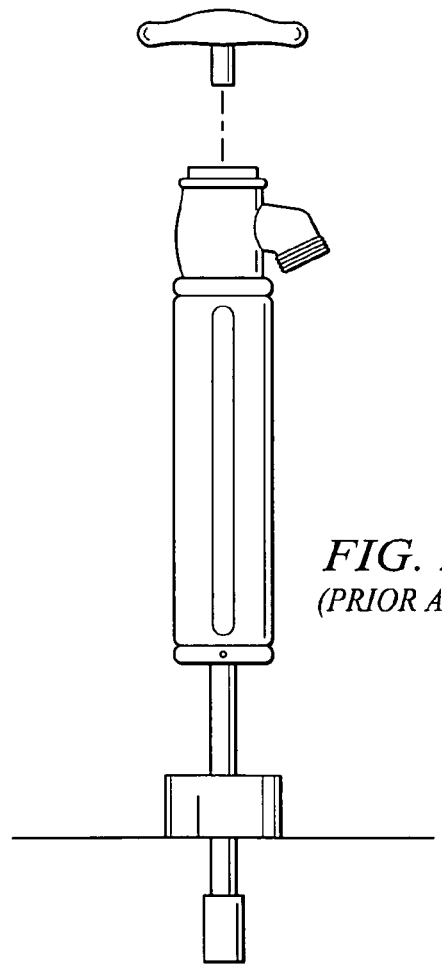

Further as illustrated in FIG. 21, threaded ball valve 75 is shown in a vertical position rather than horizontally. Opposing bevel gears 122 affixed to both this vertically installed valve as well as valve actuator shaft 77 allows turning of dome handle 5 to operate the valve while allows for the two offset fittings described in the earlier embodiment to be omitted.

What is claimed is:

1. A weather protected fluid delivery assembly comprising:
    an elongated protective shroud having a top portion and a bottom portion, said shroud including an outlet aperture in said top portion;
    a fluid valve including an inlet port for receiving a fluid from a supply source and a delivery port for delivering said fluid, said fluid valving assembly located below or within said bottom portion of said elongated protective shroud;
    a stand-pipe having a first end connected to said delivery port fluid valve, said stand-pipe extending through and to the top of said protective shroud to a second end;
    an outlet fluid member connected to said stand-pipe at a location between said first end and said second end and extending through said outlet aperture in said top portion of said protective shroud;
    a valve control stem connected to said fluid valve and extending through and above said top portion of said protective shroud;
    a dome member covering the end of said top portion of said protective shroud to protect said fluid valving assembly from inclimate weather; and
    a cylinder plunger inside said stand-pipe, said cylinder plunger moving upward inside of said stand-pipe and operating to prevent fluid from escaping through said second end of said stand-pipe when fluid is delivered through said fluid valve and said outlet fluid member.

2. The fluid delivery system of claim 1 wherein said fluid valve further comprises a drain port fluidly connected to said fluid outlet port when said fluid valve is closed and wherein said cylinder plunger moves downward when said fluid valve is closed and forces fluid in said stand-pipe below said plunger through said drain port and out of said fluid valve.

3. The fluid delivery assembly of claim 1, wherein said outlet fluid member further comprises a vacuum breaker.

4. The fluid delivery system of claim 1 wherein said dome member is connected to the top end of said valve control stem and operates as a handle to rotate said stem.

5. The fluid delivery system of claim 1 and further comprising a base member for lying along a surface and defining an aperture, wherein said elongated protective shroud extends through and is attached to said aperture of said base member.

6. The fluid delivery system of claim 1 further comprising a flange assembly attached to the bottom portion of said protective shroud and for securing said fluid delivery system to a structural support.

7. The fluid delivery system of claim 6 wherein said flange assembly comprises a cylinder and anchoring rods attached to said cylinder and wherein said cylinder is attached to the bottom portion of said protective shroud and said anchoring rods positioned about the outer surface of said cylinder for securing said rods to a building structure.

8. The fluid delivery system of claim 5 wherein said base member lies on a roof of a building structure such that the top portion of said protective shroud is above the roof of said building and the bottom portion is inside said building structure.

9. The fluid delivery system of claim 5 wherein said base member is at the surface of the ground and the bottom portion is below ground.

10. The fluid delivery system of claim 2 and further comprising first drain tubing having a first end connected to said drain port of said fluid valve and extending upward above said fluid valve to a second end.

11. The fluid delivery system of claim 10 and further comprising a discharge housing and wherein said second end of said drain tubing is connected to said discharge housing.

12. The fluid delivery system of claim 11 and further comprising second drain tubing connected between said second end of said stand-pipe and said discharge housing.

13. A method for providing a weather protected fluid delivery assembly comprising the step of:
providing an elongated protective shroud;
locating a fluid valve assembly below or within a bottom portion of said elongated protective shroud, said valve assembly having a fluid delivery port and a drain port;
connecting a first end of stand-pipe to said fluid delivery port and extending a second end of said stand-pipe though the top of said elongated protective shroud;
connecting an outlet fluid member to said stand pipe at an intermediate location between said first end and said second end, said intermediate location defining an aperture;
extending a valve control stem from a first end connected to said fluid valve through a top portion of said protective shroud to a second end;
covering said top portion of said protective shroud with a handle connected to said second end of said control stem;
providing a cylinder plunger inside said stand pipe;
opening said valve assembly and delivering said fluid to said stand pipe through said fluid delivery port of said valve assembly, said fluid flow moving said plunger from the bottom of said stand-pipe up said stand-pipe to said second end and sealing off said second end; and
delivering fluid from said stand-pipe to said outlet fluid member through said aperture.

14. The method of claim 13 further comprising the steps of:
closing said fluid valve assembly; and
forcing fluid in said stand-pipe that is below said plunger through said drain port in an upward direction to evacuate said stand-pipe.

* * * * *

UNITED STATES PATENT AND TRADEMARK OFFICE
CERTIFICATE OF CORRECTION

PATENT NO. : 7,314,057 B2
APPLICATION NO. : 11/347706
DATED : January 1, 2008
INVENTOR(S) : Parker It is certified that error appears in the above-identified patent and that said Letters Patent is hereby corrected as shown below:

On the Title Page, Item (57) Abstract, Page 1, 2$^{nd}$ line, delete "doom" and insert --dome--.
In Col. 1, line 23, delete "personal" and insert --personnel--.
In Col. 1, line 25, delete "roofs" and insert --roof's--.
In Col. 1, line 61, delete "In" and insert --in--.
In Col. 2, line 23, after weather, insert --;--.
In Col. 2, lines 50-51, delete "surface. The" and insert --surface, the--.
In Col. 3, line 13, delete "objects" and insert --objectives--.
In Col. 4, line 55, after into, insert --nut--.
In Col. 4, line 61, after is, insert --a--.
In Col. 5, line 37, after then, insert --be--.
In Col. 5, line 51, delete "threaded the" and insert --the threaded--.
In Col. 6, line 56, delete "assemble" and insert --assembly--.
In Col. 7, line 7, after O-ring, delete --ring--.
In Col. 8, line 15, delete "assemble" and insert --assembly--.
In Col. 8, line 20, delete "holds" and insert --hold--.
In Col. 8, line 27, delete "hydrant" and insert --Hydrant--.
In Col. 8, line 44, after reinforcing, delete "bar".
In Col. 8, line 57, delete "pedestal hydrant" and insert --Pedestal Hydrant--.
In Col. 8, line 60, delete "1a" and insert --1--.
In Col. 8, line 61, delete "assemble" and insert --assembly--.
In Col. 8, line 64, delete "assemble" and insert --assembly--.
In Col. 9, line 4, delete "76" and insert --70--.
In Col. 9, line 17, delete "71" and insert --70--.
In Col. 9, line 22, delete "1" and insert --81--.
In Col. 9, line 25, delete "61" and insert --69--.
In Col. 9, line 30, delete "valve," and insert --valve--.
In Col. 9, line 51, delete "23" and insert --73--.
In Col. 9, line 58, delete "31" and insert --81--.
In Col. 9, line 63, delete "13A" and insert --13B--.
In Col. 9, line 64, delete "25" and insert --75--.
In Col. 10, line 26, delete "78$a$" and insert --78--.
In Col. 10, line 60, delete "97" and insert --77--.
In Col. 10, line 64, delete "95" and insert --97--.
In Col. 11, line 28, delete "78$b$" and insert --78--.
In Col. 11, line 47, delete "aperture" and insert --adapter--.
In Col. 11, line 57, delete "retaining" and insert --restraining--.
In Col. 11, line 66, delete "retaining" and insert --restraining--.
In Col. 11, line 67, delete "pans" and insert --pins--.

UNITED STATES PATENT AND TRADEMARK OFFICE
CERTIFICATE OF CORRECTION

PATENT NO. : 7,314,057 B2
APPLICATION NO. : 11/347706
DATED : January 1, 2008
INVENTOR(S) : Parker It is certified that error appears in the above-identified patent and that said Letters Patent is hereby corrected as shown below:

In Col. 12, line 7, delete "71" and insert --70--.
In Col. 12, line 14, delete "pass" and insert --passes--.
In Col. 12, line 30, delete "retrains" and insert --restrains--.
In Col. 13, line 31, delete "aids" and insert --aid--.
In Col. 13, line 40, delete "116" and insert --117--.
In Col. 13, line 61, delete "91" and insert --81--.
In Col. 13, line 62, delete "70A" and insert --70a--.
In Col. 14, line 4, delete "retaining" and insert --restraining--.
In Col. 14, line 10, delete "while" and insert --which--.

Signed and Sealed this

Tenth Day of June, 2008

JON W. DUDAS
*Director of the United States Patent and Trademark Office*